(12) United States Patent
Yamamoto et al.

(10) Patent No.: US 7,867,118 B2
(45) Date of Patent: Jan. 11, 2011

(54) BICYCLE FRONT DERAILLEUR

(75) Inventors: Kazufumi Yamamoto, Sakai (JP); Nobuyoshi Fujii, Sakai (JP); Yoshiaki Nankou, Sakai (JP)

(73) Assignee: Shimano Inc., Osaka (JP)

( * ) Notice: Subject to any disclaimer, the term of this patent is extended or adjusted under 35 U.S.C. 154(b) by 558 days.

(21) Appl. No.: 11/453,220

(22) Filed: Jun. 15, 2006

(65) Prior Publication Data

US 2007/0293359 A1 Dec. 20, 2007

(51) Int. Cl.
*F16H 9/00* (2006.01)
*F16H 59/00* (2006.01)
*F16H 61/00* (2006.01)
*F16H 63/00* (2006.01)

(52) U.S. Cl. .......................................... 474/80; 474/82
(58) Field of Classification Search ................... 474/80, 474/82, 144
See application file for complete search history.

(56) References Cited

U.S. PATENT DOCUMENTS

| 4,199,998 | A | * | 4/1980 | Isobe | 474/82 |
| 4,237,743 | A | * | 12/1980 | Nagano | 474/82 |
| 4,330,137 | A | | 5/1982 | Nagano | |
| 4,832,667 | A | * | 5/1989 | Wren | 474/140 |
| 5,002,520 | A | * | 3/1991 | Greenlaw | 474/140 |
| 5,496,222 | A | * | 3/1996 | Kojima et al. | 474/82 |
| 5,620,384 | A | * | 4/1997 | Kojima et al. | 474/82 |
| 5,728,018 | A | * | 3/1998 | Terada et al. | 474/80 |
| 5,782,714 | A | * | 7/1998 | Osgood | 474/144 |
| 6,099,425 | A | | 8/2000 | Kondo | |
| 6,117,032 | A | | 9/2000 | Nankou | |
| 6,270,124 | B1 | | 8/2001 | Nanko | |
| 6,277,044 | B1 | * | 8/2001 | Fujimoto | 474/80 |
| 6,612,950 | B2 | * | 9/2003 | Nanko | 474/82 |
| 6,902,503 | B2 | | 6/2005 | Nanko | |
| 2003/0100393 | A1 | | 5/2003 | Nanko | |

FOREIGN PATENT DOCUMENTS

| DE | 31 18035 A1 | 2/1982 |
| JP | 08-324480 A | 12/1996 |
| JP | U-2607188 | 2/2001 |

OTHER PUBLICATIONS

Shimano Inc. 2004 Shimano Catalogue; XTR; 1 page.
Shimano Inc.; 2004 Shimano Engineering Drawing of Bottom Bracket Plate of FD-M960-E.

* cited by examiner

*Primary Examiner*—Michael R Mansen
*Assistant Examiner*—Henry Liu
(74) *Attorney, Agent, or Firm*—Global IP Counselors, LLP

(57) ABSTRACT

A bicycle front derailleur includes a fixed member, a chain guide and a linkage assembly. The fixed member includes a fixing body and a projection part fixedly coupled together. The fixing body includes a fastening portion with a seat tube reference plane that aligns with a longitudinal center axis of a seat tube when coupled thereto. The projection part has a projecting surface offset axially from the fixing body toward a smallest front chain ring of a bicycle front crankset. The projecting surface has an overall vertical height lying substantially in a single plane measured in a direction parallel to the seat tube reference plane that is greater than 10 millimeters in an area between the seat tube reference plane and 23 millimeters measured perpendicularly and forwardly from the seat tube reference plane.

13 Claims, 17 Drawing Sheets

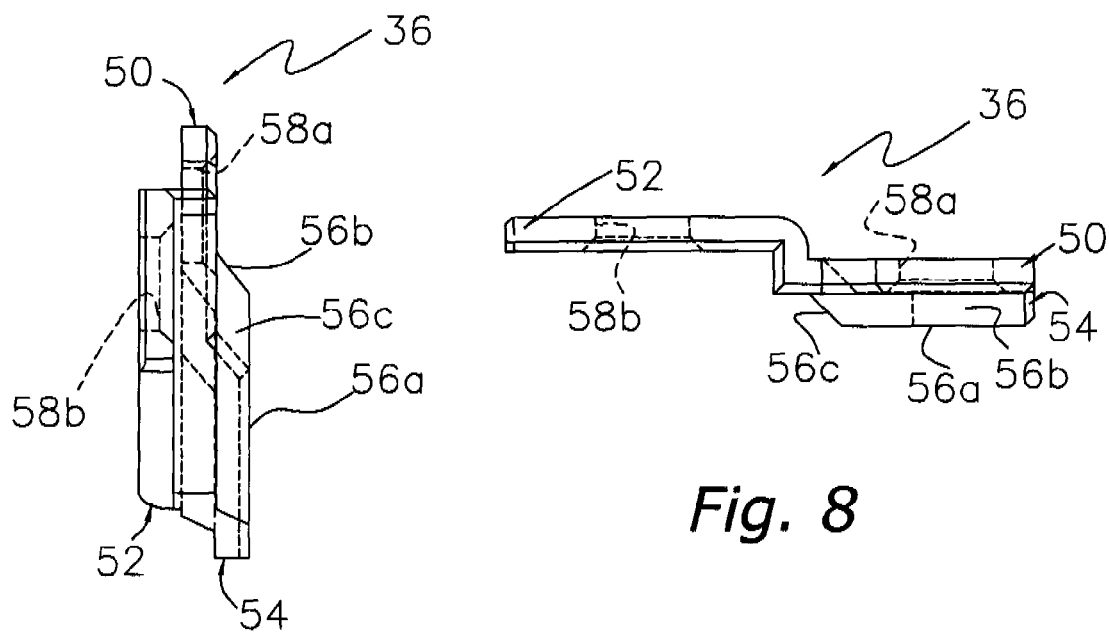
Fig. 7
Fig. 8
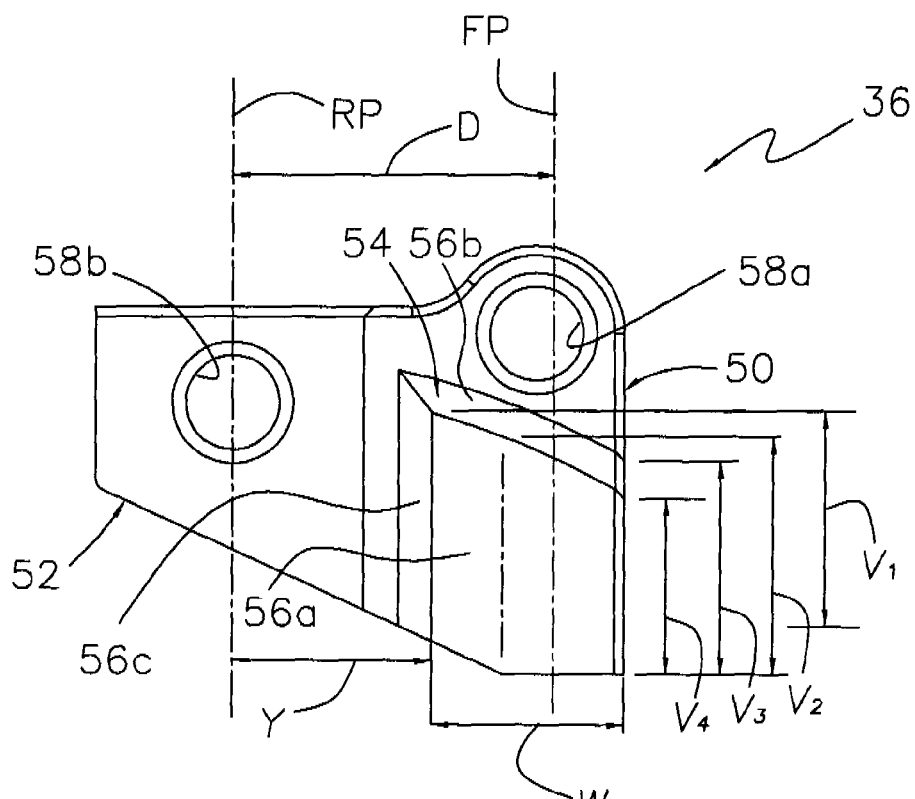
Fig. 9

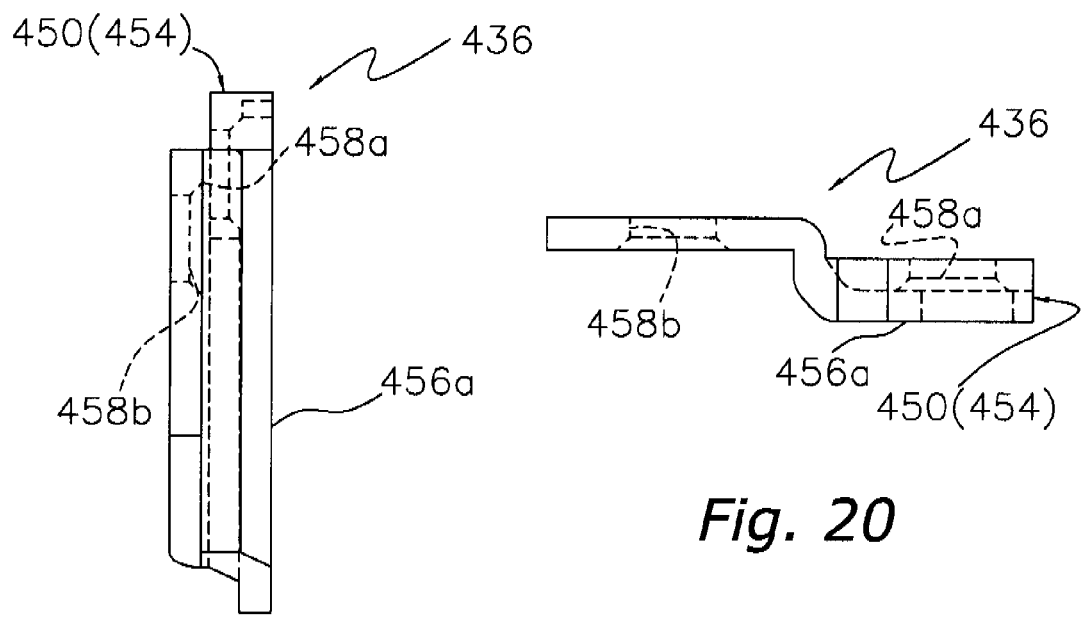
Fig. 19
Fig. 20
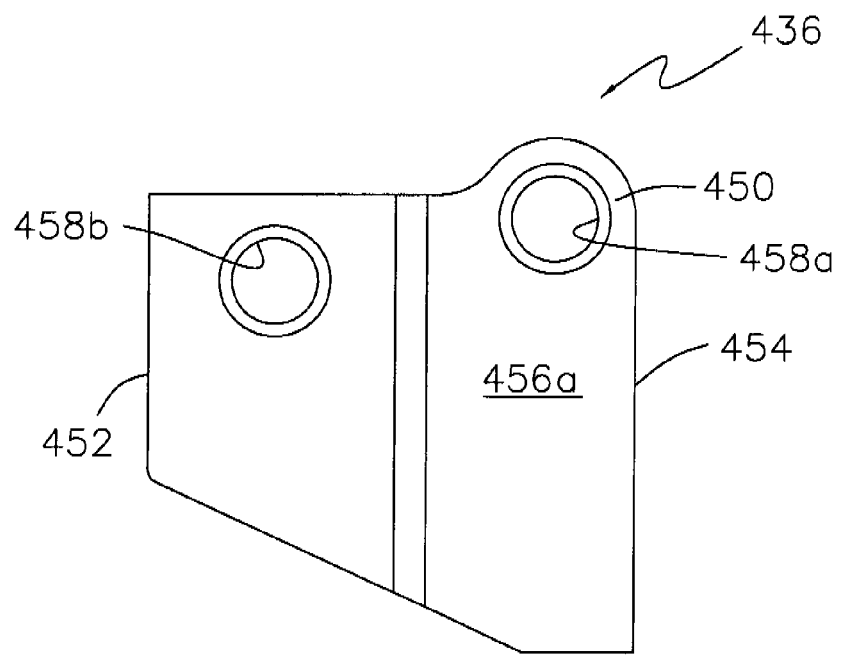
Fig. 21

BICYCLE FRONT DERAILLEUR

BACKGROUND OF THE INVENTION

1. Field of the Invention

This invention generally relates to a bicycle front derailleur. More specifically, the present invention relates to a bicycle front derailleur, which is designed to be attached to a seat tube of a bicycle frame and which includes chain dropping prevention part to prevent the chain from falling off the inner side of the smallest front sprocket.

1. Background Information

Bicycling is becoming an increasingly more popular form of recreation as well as a means of transportation. Moreover, bicycling has become a very popular competitive sport for both amateurs and professionals. Whether the bicycle is used for recreation, transportation or competition, the bicycle industry is constantly improving the various components of the bicycle. One component that has been extensively redesigned is the bicycle front derailleur.

Generally, a front derailleur includes a fixed member nonmovably secured to the bicycle frame and a movable member movably coupled to the fixed member using a linkage assembly so as to be laterally movable relative to the fixed member. The movable member includes an attachment portion and a chain guide with a pair of cage plates for contacting and moving a chain between the front sprockets. A biasing member normally biases the movable member and chain guide to a retracted position or an extended position relative to the fixed member. The fixed member of the front derailleur of the bicycle is typically mounted onto the bicycle frame adjacent to the front sprockets. Specifically, the front derailleur is usually clamped onto the seat tube of the frame.

The movable member is movable relative to the fixed member by pulling or releasing a shift control cable to move against or due to the biasing force of the biasing member. In particular, the movable member and fixed member usually are interconnected through pivotal links of the linkage assembly, while the control cable is connected to one of the pivotal links. Thus, upon pulling the shift control cable, a torque is applied to the link to move the movable member against the biasing force of the biasing member. Alternatively, when the shift control cable is released, the biasing member applies torque in the opposite direction to cause the movable member to move in the opposite direction. Depending on the arrangement and locations of the cable guides, the cable attachment member of the front derailleur may need to be configured differently for different types of frames. An example of such a front derailleur is disclosed in U.S. Patent Publication No. 2003/0100393. While this derailleur works well, it does suffer from some deficiencies.

One problem with this front derailleur and other typical front derailleurs is that it is possible for the chain to fall off the smallest front chain ring to the inner side, especially if the front derailleur gets out of proper adjustment, when riding on especially uneven terrain and/or when used on a dual suspension bicycle. Accordingly, some front derailleurs have been provided that include a guide portion in order to reduce this problem. For example, Japanese Utility Model Patent No. 2607188 discloses such a front derailleur. This front derailleur is mounted on the bottom bracket of the front crankset using a relatively thin plate. The guide portion is formed on this relatively thin bottom bracket mounting plate. This arrangement generally works well. However, this arrangement does not always perform optimally, especially when used on dual suspension type bicycles.

In view of the above, it will be apparent to those skilled in the art from this disclosure that there exists a need for an improved bicycle front derailleur. This invention addresses this need in the art as well as other needs, which will become apparent to those skilled in the art from this disclosure.

SUMMARY OF THE INVENTION

One object of the present invention is to provide a bicycle front derailleur, which provides smooth, reliable shifting of the chain guide even when riding over uneven terrain and/or in extreme riding conditions such as through mud, rain, or dirt.

Another object of the present invention is to provide a bicycle front derailleur, which is rigidly attached to the seat tube yet prevents the chain from dropping off the smallest chain ring to the inner side.

Another object of the present invention is to provide a bicycle front derailleur, which reliably prevents the chain from dropping off the smallest chain ring to the inner side and which is compatible with a variety of bicycle frames including dual suspension frames.

Another object of the present invention is to provide a bicycle front derailleur, which is relatively simple and inexpensive to manufacture and assemble.

The foregoing objects can basically be attained by providing a bicycle front derailleur, which includes a fixed member, a chain guide and a linkage assembly. The fixed member includes a fixing body and a projection part fixedly coupled to the fixing body. The fixing body includes a fastening portion with a seat tube reference plane that aligns with a longitudinal center axis of a seat tube when coupled thereto. The projection part has a projecting surface offset axially from the fixing body toward a smallest front chain ring of a bicycle front crankset. The projecting surface has an overall vertical height lying substantially in a single plane measured in a direction parallel to the seat tube reference plane that is greater than 10 millimeters in an area between the seat tube reference plane and 23 millimeters measured perpendicularly and forwardly from the seat tube reference plane. The chain guide is configured to move between a retracted position and an extended position relative to the fixing body. The linkage assembly is coupled between the fixing body and the chain guide in order to move the chain guide between the retracted position and the extended position.

These and other objects, features, aspects and advantages of the present invention will become apparent to those skilled in the art from the following detailed description, which, taken in conjunction with the annexed drawings, discloses a preferred embodiment of the present invention.

BRIEF DESCRIPTION OF THE DRAWINGS

Referring now to the attached drawings which form a part of this original disclosure:

FIG. 7 is an enlarged, rear elevational view of the projection part illustrated in FIGS. 2-6;

FIG. 8 is a top elevational view of the projection part illustrated in FIG. 7;

FIG. 9 is an outside, side elevational view of the projection part illustrated in FIGS. 7 and 8;

FIG. 19 is an enlarged, rear elevational view of the projection part of the front derailleur illustrated in FIG. 18;

FIG. 20 is a top elevational view of the projection part illustrated in FIG. 19; and FIG. 21 is an outside, side elevational view of the projection part illustrated in FIGS. 19 and 20.

DETAILED DESCRIPTION OF THE PREFERRED EMBODIMENTS

Selected embodiments of the present invention will now be explained with reference to the drawings. It will be apparent to those skilled in the art from this disclosure that the following descriptions of the embodiments of the present invention are provided for illustration only and not for the purpose of limiting the invention as defined by the appended claims and their equivalents.

Figure 1:
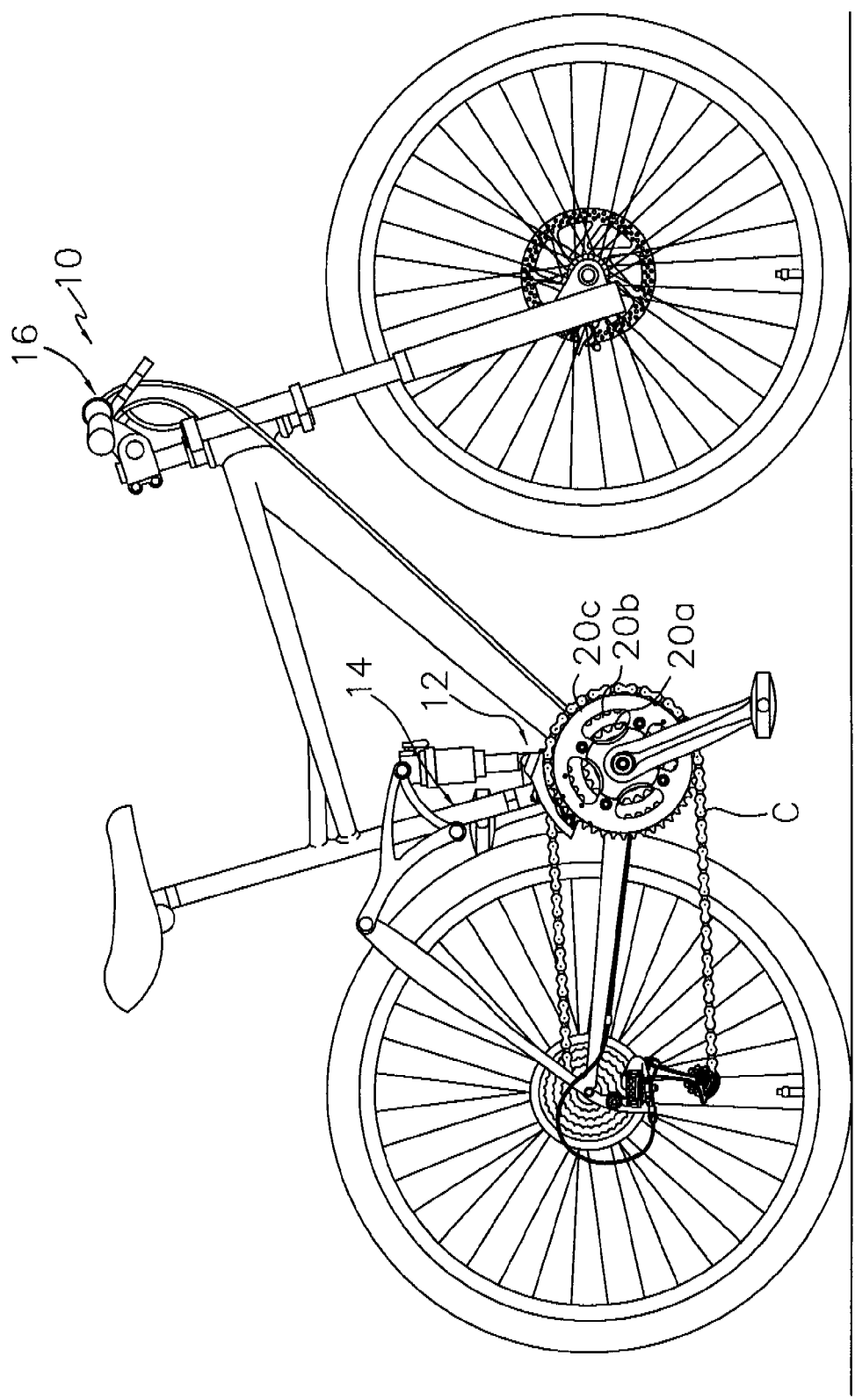
FIG. 1 is a side elevational view of a bicycle with a bicycle front derailleur coupled thereto in accordance with a preferred embodiment of the present invention.

Referring initially to FIG. 1, a bicycle 10 is illustrated with a front derailleur 12 fixedly coupled to a seat tube portion 14 of its frame, in accordance with a first embodiment of the present invention. The front derailleur 12 is operated by a shifting unit 16 via a shift cable 18 to move a chain C between front sprockets or chain rings 20a, 20b and 20c of increasing size. Bicycles and their various components are well known in the art, and thus, the bicycle 10 and its various components will not be discussed and/or illustrated in detail herein except for the components that relate to the present invention. In other words, only the front derailleur 12 and the components that relate thereto will be discussed and/or illustrated in detail herein.

Referring to FIGS. 1-6, the front derailleur 12 of the present invention includes a fixed member 22, a cable attachment link 24, a support link 26 and a chain guide 28. The fixed member 22 is fixedly attached to a mounting element 15 of the seat tube portion 14 in accordance with the present invention, as explained below. The fixed member 22 includes a projection part 36 configured and arranged to prevent the chain C from dropping/falling off the smallest front chain ring 20a to the inside (toward the frame) in accordance with the present invention, as also explained below. Otherwise, the front derailleur 12 of the present invention is relatively conventional. Thus, the chain guide 28 is movably supported on the fixed member 22 by the cable attachment link 24 and the support link 26 to move between a plurality of shift positions that correspond to the number of front sprockets in a conventional manner.

Figure 3:
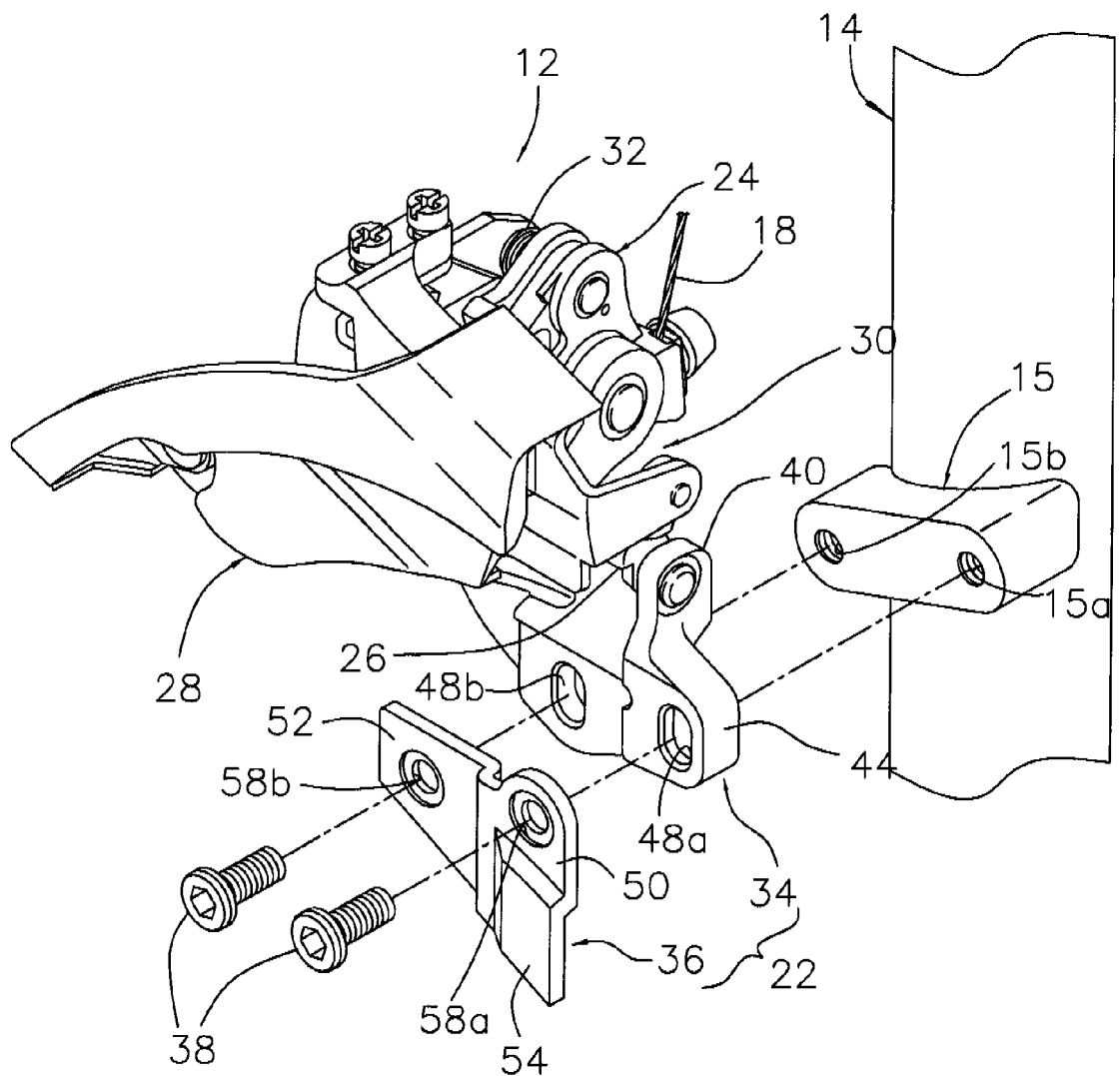
FIG. 3 is a further enlarged, partially exploded, perspective view of the bicycle front derailleur and frame illustrated in FIG. 2.

The front derailleur 12 is designed to accommodate a variety of bicycles. In particular, front derailleur 12 can be used with the shift cable 18 coming from above the front derailleur 12 as seen in FIG. 3, or with the shift cable 18 coming from below the front derailleur 12 (not shown). The cable attachment link 24 includes a guide groove used to guide the shift cable downwardly when desired in a conventional manner. The front derailleur 12 is particularly suited to dual suspension type off-road bicycles. Specifically, the mounting arrangement of the fixed member 22 and the projection part 36 of the present invention have configurations that facilitate use on a variety of dual suspension type off-road bicycles, as explained below. However, it will be apparent to those skilled in the art from this disclosure that the present invention can be applied to any type of bicycle as needed and/or desired.

Figure 4:
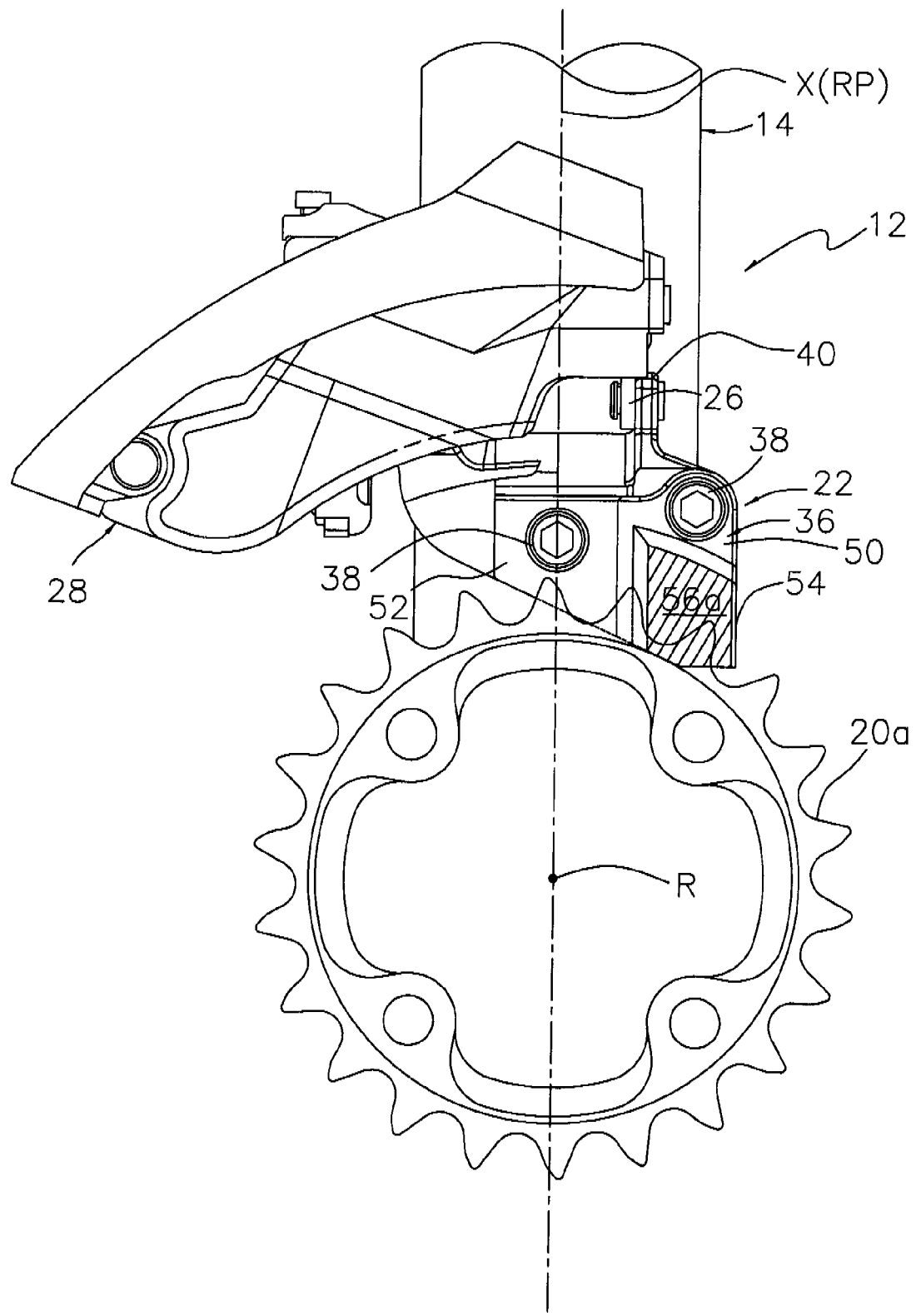
FIG. 4 is an enlarged outside elevational view of the front derailleur illustrated in FIGS. 1-3 with the smallest front chain ring illustrated but with other parts of the bicycle and the front crankset removed for the purpose of illustration.
Figure 5:
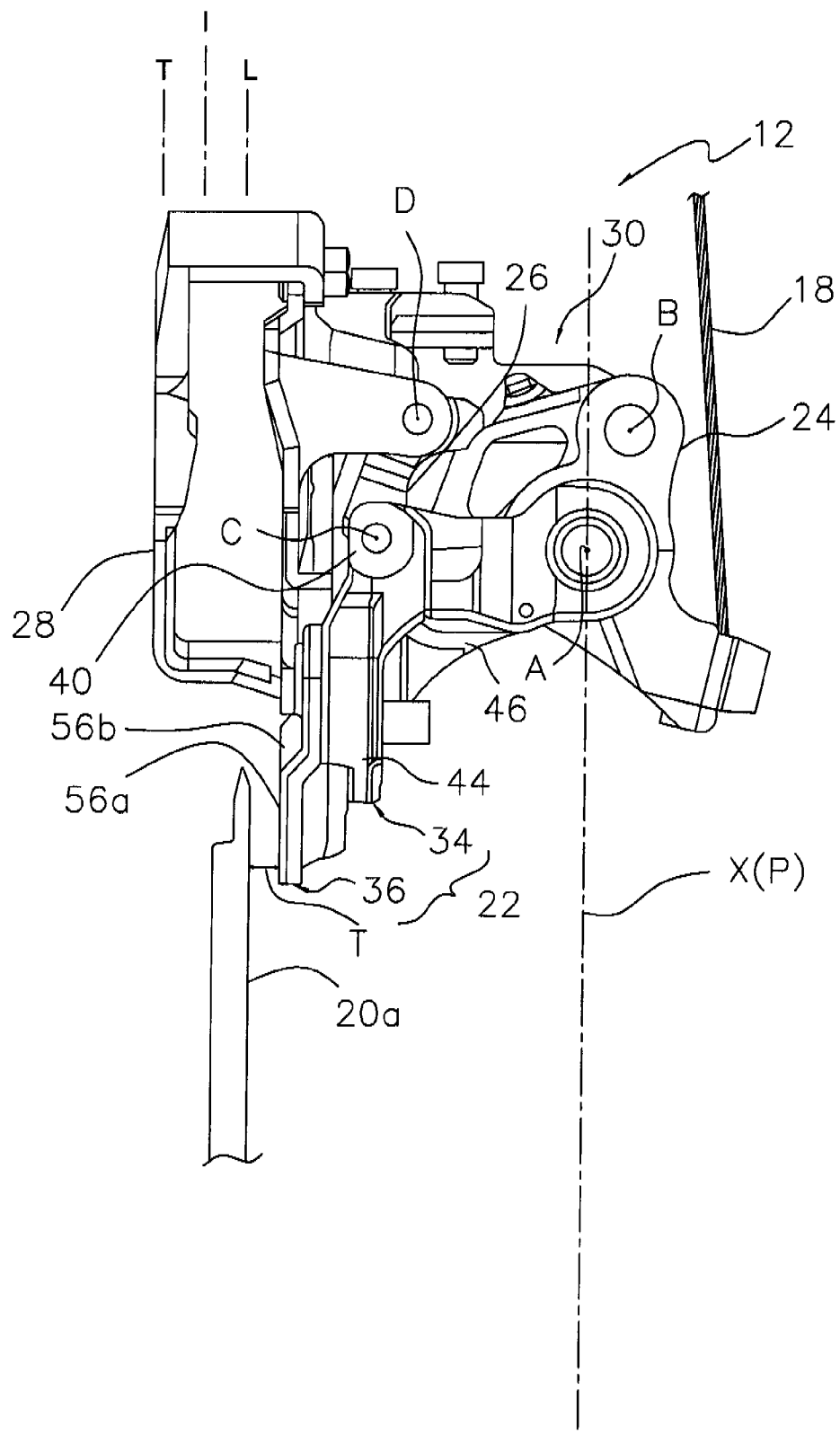
FIG. 5 is a front elevational view of the front derailleur and smallest front chain ring illustrated in FIG. 4, with the chain guide in the low position.
Figure 6:
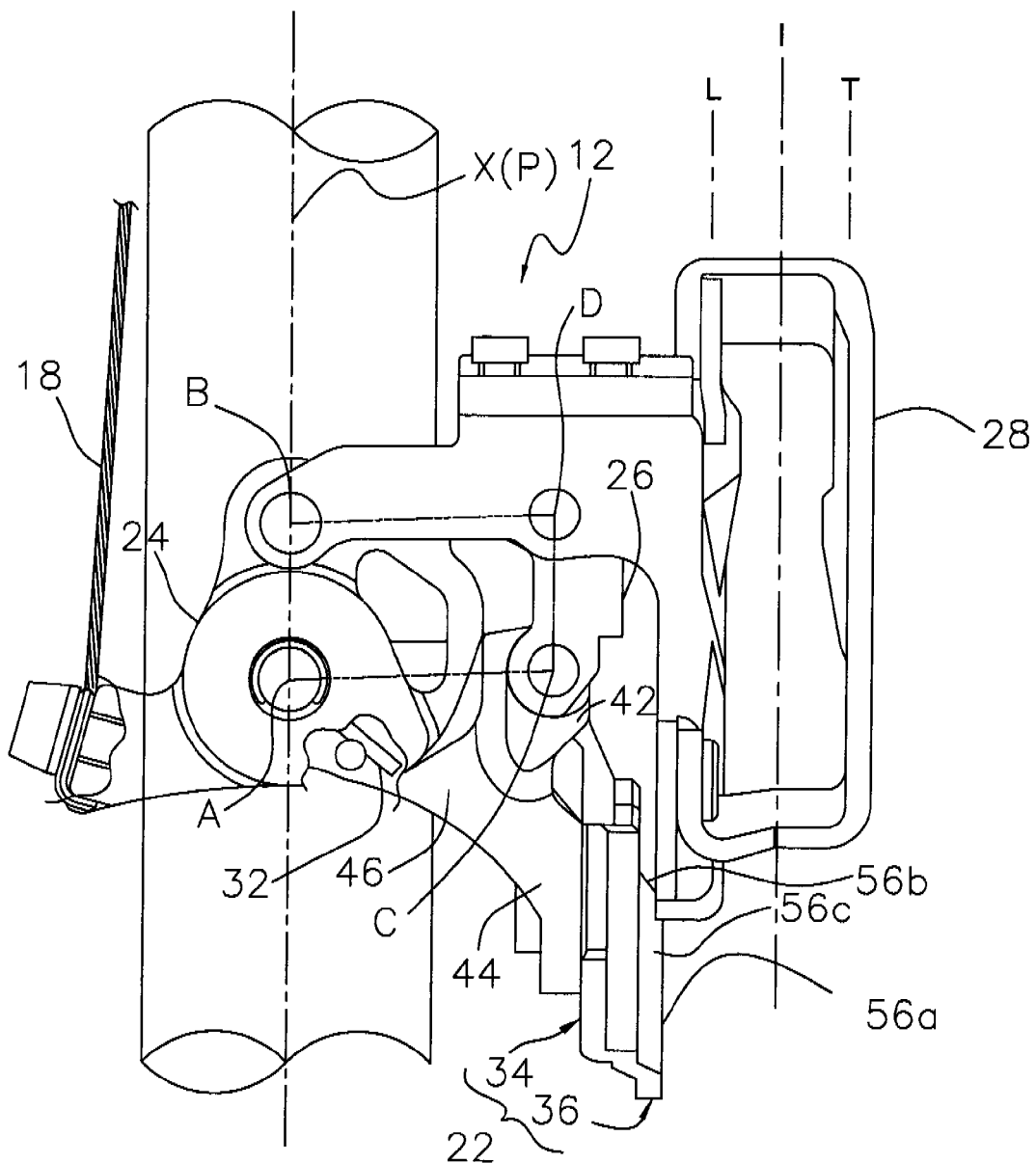
FIG. 6 is a rear elevational view of the front derailleur illustrated in FIGS. 2-5, with the chain guide in the intermediate position.

Referring now to FIGS. 2-6, portions of the fixed member 22, the cable attachment link 24, the support link 26 and the chain guide 28 form parts of a linkage assembly 30. The linkage assembly 30 is preferably a four bar linkage assembly that is defined by four pivot axes A, B, C and D as best seen in FIGS. 5 and 6. A portion of the cable attachment link 24 defines a first link between the pivot axes A and B. A portion of the support link 26 defines a second link between the pivot axes C and D. A portion of the chain guide 28 defines a third link between the pivot axes B and D. A portion of the fixed member 22 defines a fourth link between the pivot axes A and C. Thus, the front derailleur 12 basically includes the fixed member 22, the chain guide 28 and the linkage assembly 30 coupled between the fixed member 22 and the chain guide 28 to form the four-bar linkage.

The fixed member 22, the cable attachment link 24, the support link 26 and the chain guide 28 are pivotally coupled together using pivot pins in a conventional manner. Thus, the chain guide 28 is movably coupled to the cable attachment link 24 and the support link 26 to move between a retracted (low gear) position L, an intermediate (middle gear) position I and a fully extended (top gear) position T relative to the fixed member 22, as best understood from FIGS. 5 and 6. The support link 26 and the chain guide 28 have an adjustment mechanism coupled therebetween in a conventional manner to adjust the top and low positions T and L of the chain guide 28 in a conventional manner. The intermediate position I is also considered an extended position relative to the retracted low position L. Furthermore, the intermediate position I can be considered a retracted position relative to the top position T. In any case, the chain guide 28 is movable between at least one retracted position (e.g. the low position L) and at least one extended position (e.g. the intermediate position). In other words, optionally, one of the front chain rings 20a, 20b and 20c (e.g. the largest front chain ring 20c corresponding to the top gear position T for the chain guide 28) may be eliminated such that only two front chain rings 20a and 20b are present in a conventional manner.

Referring still to FIGS. 2-6, the fixed member 22 is preferably located beneath the chain guide 28 (at least below the top portion of the chain guide 28 coupled to the cable attachment link 24 and the support link 26). The linkage assembly 30 is preferably designed such that a biasing member (torsion spring) 32 normally biases the chain guide 28 in a transverse direction towards a longitudinal center plane P of the bicycle 10. In other words, the chain guide 28 is normally biased toward the retracted (low gear) position L. The biasing member 32 is preferably a torsion spring having a first end engaging the cable attachment link 24, and a second end engaging the fixed member 22 for normally biasing the chain guide 28 from its extended most position to its retracted most position.

Thus, when the chain guide 28 is closest to the frame of bicycle 10 in the retracted position, the chain guide 28 holds the chain C over the smallest front chain ring 20a that is closest to the seat tube portion 14. When the linkage assembly 30 holds chain guide 28 furthest from the frame of the bicycle 10 in its extended most position over the largest front chain ring 20c, the chain guide 28 is located over the outermost sprocket 20c to hold the chain C on the furthest sprocket 20c from the seat tube portion 14. Pulling the shift cable 18 causes the chain guide 28 to move laterally outwardly against the biasing force of the biasing member 32 (i.e., toward the largest front chain ring 20c), while releasing the shift cable 18 causes the chain guide 28 to move laterally inwardly due to the biasing force of the biasing member 32 (i.e., toward the smallest front chain ring 20a). The shift cable 18 is attached to the cable attachment link 24 using a cable attachment structure in a conventional manner to control movement of the linkage assembly 30 based on rider input at the shifting unit 16.

Specifically, when the rider desires an up shift, the rider operates the shifting unit 16 to pull the shift cable 18 to move the chain guide 28 toward the extended most position via the linkage assembly 30 in a conventional manner. On the other hand, when the rider desires a down shift, the rider operates the shifting unit 16 to release the shift cable 18 to move the chain guide 28 toward the retracted most position via the linkage assembly 30 due to the biasing force of the biasing member 32 in a conventional manner. The shifting unit 16 is conventional and can be any of a variety of types of shifting units that takes-up and releases the shift cable 18 in response to rider input (e.g., movement of one or more levers or buttons in a conventional manner). Therefore, the precise structure of the shifting unit 16 will not be discussed or illustrated in detail herein.

The cable attachment link 24, the support link 26 and the chain guide 28 are each preferably constructed of a lightweight rigid material such as a metallic material in a conventional manner. The cable attachment link 24, the support link 26 and the chain guide 28 are conventional, except as explained and/or illustrated herein. Thus, the cable attachment link 24, the support link 26 and the chain guide 28 will not be discussed and/or illustrated in detail herein, except as related to the present invention.

Figure 2:
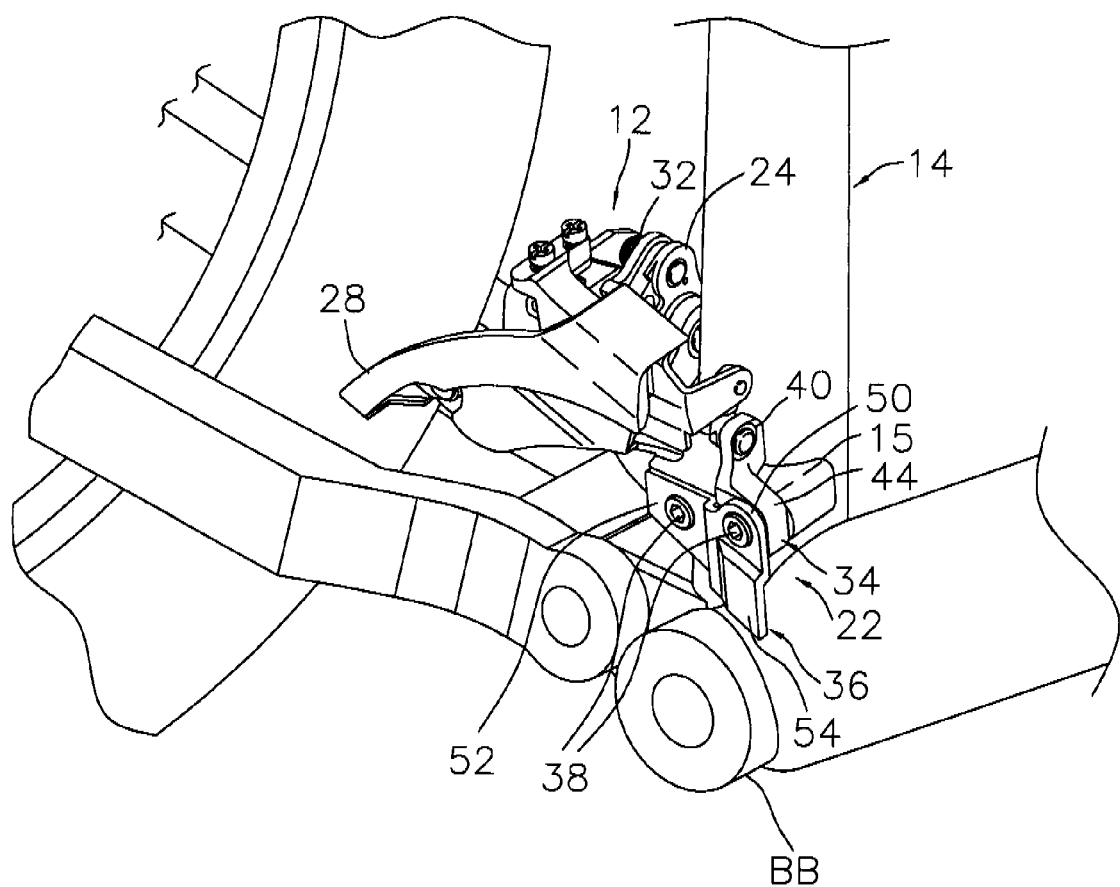
FIG. 2 is an enlarged, front perspective view of a portion of the frame of the bicycle illustrated in FIG. 1, with the bicycle front derailleur coupled thereto and with the front crankset and chain removed for the purpose of illustration.

As best seen in FIGS. 2 and 3, the fixed member 22 is preferably bolted directly to the mounting element 15 of the seat tube portion 14. The mounting element 15 is welded to the seat tube portion 14 to form a part thereof. The mounting element 15 is located at a vertical position such that the front derailleur 12 can be properly vertically oriented relative to the front chain rings 20a, 20b and 20c (particularly, the smallest chain ring 20a). As used herein, the term "vertical" refers to a direction substantially parallel to a center axis X of the seat tube portion 14. The center axis X lies in a longitudinal center plane P of the bicycle 10. The mounting element 15 has a pair of threaded attachment holes 15a and 15b used to attach the fixed member 22 thereto, as explained below. The attachment hole 15a is located forward of the attachment hole 15b. The attachment hole 15b is preferably aligned with the center axis X of the seat tube portion 14 when viewed axially along the attachment hole 15b, as seen in FIG. 4.

Referring still to FIGS. 2-6, the fixed member 22 basically includes a fixing body 34 and the projection part 36 that are fixedly coupled together using a pair of fasteners 38. The fasteners 38 are also used to fixedly attach the fixing body 34 and the projection part 36 to the mounting element 15 of the seat tube portion 14, as best understood from FIGS. 2 and 3. Preferably, the fasteners 38 are threaded fasteners such as bolts with each having a threaded shaft portion and an enlarged head portion used to facilitate rotation with a tool (e.g., with a hexagonal bore or the like) in a conventional manner. Thus, in this embodiment, the projection part 36 is formed as a separate member from the fixing body 34. However, alternatively, the fixing body 34 and the projection part 36 can be integrally formed as a one-piece, unitary member, as discussed below with reference to another preferred embodiment of the present invention.

The fixing body 34 and the projection part 36 are each preferably constructed of a lightweight, rigid material that is well known in the bicycle art. In the illustrated embodiment, the fixing body 34 and the projection part 36 are each constructed of a metallic material. However, it will be apparent to those skilled in the art from this disclosure that the fixing body 34 and the projection part 36 could be constructed of other materials that are well known in the bicycle art such as a hard rigid plastic material. Moreover, the fixing body 34 and the projection part 36 could each be constructed of a different material if needed and/or desired. In the illustrated embodiment, the fixing body 34 and the projection part 36 are preferably constructed by utilizing conventional manufacturing techniques such as casting and/or machining.

Referring still to FIGS. 2-6, the fixing body 34 includes portions of the linkage assembly 30, as mentioned above. In particular, portions of the linkage assembly 30 are preferably integrally formed with the fixing body 34. Specifically, the fixing body 34 has a pair (first and second) of mounting flanges 40 and 42 that extend outwardly/upwardly from a fastening portion 44 and an additional (third) mounting portion of flange 46 extending laterally/inwardly from the fastening portion 44. The first and second mounting flanges 40 and 42 have one end of the support link 26 pivotally coupled thereto, while the third mounting flange 46 has the cable attachment link 24 pivotally coupled thereto. The cable attachment link 24 is also pivotally coupled to the chain guide 28 at a location spaced from the third mounting flange 46, while the support link 26 is also pivotally coupled to the chain guide 28 at locations spaced from the first and second mounting flanges 40 and 42. Thus, the support link 26 is pivotally coupled to the fixed member 22 for rotation about the pivot axis B, while the cable attachment link 24 is pivotally coupled to the fixed member 22 for rotation about the pivot axis A.

The fastening portion 44 is attached to the mounting element 15 of the seat tube portion 14 via the fasteners 38. Specifically, the fastening portion 44 has a pair of through holes 48a and 48b extending therethrough. The through holes 48a and 48b receive the fasteners 38 therethrough in order to fixedly attach the fixing body 34 to the mounting element 15 (i.e., via the attachment holes 15a and 15b, respectively), and to fixedly attach the projection part 36 to the fixing body 34. Thus, the fixing body 34 and the projection part 36 are non-movable relative to the seat tube portion 14 when fixedly attached thereto with the fasteners 38. The through holes 48a and 48b are preferably slightly elongated in a vertical direction (parallel to the center axis X of the seat tube portion 14 such that the vertical position of the front derailleur 12 can be slightly adjusted relative to the seat tube portion 14 (i.e. the mounting element 15) and/or the front chain rings 20a, 20b and 20c.

The through hole 48a is located forwardly of the through hole 48b such that the through holes 48a and 48b are aligned with the threaded attachment holes 15a and 15b, respectively. The through hole 48b is preferably aligned with the center axis X of the seat tube portion 14 when viewed axially along the through hole 48b, as best understood from FIGS. 3 and 4. A vertically arranged seat tube reference plane RP of the fastening portion 44 of the fixing body 34 is aligned with the center axis X of the seat tube portion 14. Preferably, the seat tube reference plane RP passes through the center of the through hole 48b. The seat tube reference plane RP is perpendicular to the longitudinal center plane P of the bicycle 10.

Referring now to FIG. 2-9, the projection part 36 includes a forward mounting portion 50, a rearward mounting portion 52 and a projecting portion 54 non-movably coupled relative to the fastening portion 44 of the fixing body 34. Preferably, the forward mounting portion 50, the rearward mounting portion 52 and the projecting portion 54 are integrally formed together as a one-piece, unitary member. The projection part 36 is attached to an outer lateral (axially facing) side of the fixing body 34 to project axially toward the smallest front chain ring 20a from the fixing body 34. Specifically, the projecting portion 54 projects axially toward the smallest front chain ring 20a to prevent the chain C from falling between the smallest front chain ring 20a and the front derailleur 12, as explained below. The term "axially" as used herein refers to a direction parallel to the center rotation axis R of the front chain rings 20a, 20b and 20c, as best understood from FIGS. 4-6.

The forward mounting portion 50 has a forward mounting hole 58a formed therein, while the rearward mounting portion has a rearward mounting hole 58b formed therein. The rearward mounting portion 52 is offset axially toward the center plane P from the forward mounting portion 50. The attachment holes 58a and 58b are aligned with the elongated through holes 48a and 48b and the threaded attachment holes 15a and 15b, respectively. Preferably, the attachment holes 58a and 58b are stepped, unthreaded bores configured to receive the threaded shafts of the fasteners 38 therethrough, and to receive the enlarged heads of the fasteners 38 therein in a substantially flush arrangement, as best understood from FIGS. 2-6.

The projecting portion 54 basically includes a projecting surface 56a, an upper chamfer surface 56b and a rearward chamfer surface 56c, as best seen in FIGS. 7-9. The projecting surface 56a is offset axially from the fixing body 34 toward the smallest front chain ring 20a of the bicycle front crankset. Also, the projecting surface 56a is preferably axially offset from the front and rear mounting portions 50 and 52 toward the smallest front chain ring 20a of the bicycle front crankset. In particular, the projecting surface 56a is preferably axially offset about 2.4 millimeters from the forward mounting portion 50, and about 5.5 millimeters from the rearward mounting portion 52.

The projecting surface 56a is preferably spaced a distance T that is less than about 4 millimeters from the inner lateral side of the smallest front chain ring 20a, as seen in FIG. 5. Preferably the distance T is about 3.82 millimeters in order to provide optimal performance with the typical (relatively narrow) chains used in recent years. In any case, the distance T is configured to prevent the chain C from falling between the projecting surface 56a and the smallest front chain ring 20a. Thus, the distance T is at least smaller than the width of the chain C. The structures of typical chains are well known in the bicycle art. Thus, the chain C will not be discussed in further detail herein. The projecting surface 56a is cross-hatched in FIG. 4 for the purpose of illustration.

In the illustrated embodiment, the projecting surface 56a is a planar surface that is perpendicular to the reference plane RP of the fastening portion 44 of the fixing body 34. Thus, in the illustrated embodiment, the projecting surface 56a is parallel to the longitudinal center plane P of the bicycle 10 and the center longitudinal axis X of the seat tube portion 14. In any case, the projecting surface 56a is preferably substantially planar and substantially perpendicular to the seat tube reference plane RP. However, it will be apparent to those skilled in the art from this disclosure that the projecting surface 56a can have other configurations as needed and/or desired. For example, it will be apparent to those skilled in the art from this disclosure that the projecting surface 56a can have grooves, undulations, textures and the like so long as an effectively planar area shaped and sized as discussed and illustrated herein is provided. In other words, the projecting surface 56a is preferably substantially planar.

Referring to FIG. 9, the projecting surface 56a has a first overall vertical height $V_1$ measured along a rearward edge of the projecting surface 56a, a second overall vertical height $V_2$ measured along a phantom line spaced from the rearward edge of the projecting surface 56a, a third overall vertical height $V_3$ measured along a front plane FP of the fastening portion 44, and a fourth overall vertical height $V_4$ measured along a forward most edge of the projecting surface 56a. In the illustrated embodiment, the first overall vertical height $V_1$ is about 16.5 millimeters, the second overall vertical height $V_2$ is about 17 millimeters, the third overall vertical height $V_3$ is about 16 millimeters, and the fourth overall vertical height $V_4$ is about 13 millimeters.

The front plane FP of the fastening portion 44 of the fixing body 34 is spaced distance D, preferably 23 millimeters, from the seat tube reference plane RP, and is parallel to the seat tube reference plane RP. Due to the shape of the projecting surface 56a and the above preferred dimensions for $V_1$, $V_2$ and $V_3$, the projecting surface 56a preferably has an overall vertical height lying substantially in a single plane measured in a direction parallel to the seat tube reference plane RP that is between about 16 millimeters and about 17 millimeters (i.e., between $V_2$ and $V_3$) in the area between the seat tube reference plane RP and front plane FP (i.e., between the rearward most edge of the projecting surface 56a and the forward plane FP) measured perpendicularly and forwardly from the seat tube reference plane RP.

In any case, the projecting surface 56a has an overall vertical height lying substantially in a single plane measured in a direction parallel to the seat tube reference plane RP that is greater than 10 millimeters, preferably at least about 15 millimeters, in the area between the seat tube reference plane RP and 23 millimeters (i.e., the front plane FP) measured perpendicularly and forwardly from the seat tube reference plane RP. Moreover, as best understood from FIG. 9, since the fourth overall vertical height $V_4$ is the smallest vertical height of the substantially planar projecting surface 56a, the entire projecting surface 56a has an overall vertical height of at least about 13 millimeters along its entire width.

The projecting surface 56a has a width W that is preferably about 14 millimeters. The rearward edge of the projecting surface 56a is located a distance Y from the seat tube reference plane RP measured in a direction perpendicular to the seat tube reference plane RP. In the illustrated embodiment, the distance Y is about 14.5 millimeters. Thus, in the illustrated embodiment, the forward most edge of the projecting surface 56a is located about 28.5 millimeters from the seat tube reference plane. The lower most edge of the projecting surface 56a is spaced vertically about 20 millimeters below the center of the rearward mounting hole 58b and about 25 millimeters vertically below the center of the forward mounting hole 58a.

The forward plane FP is located about 1 millimeter forward of the center of the forward mounting hole 58a. Thus, the center of the forward mounting hole 58a is located about 22 millimeters forward of the seat tube reference plane RP. Typically, the area of the projecting surface 56a between about 14 millimeters and about 22 millimeters from the seat tube reference plane RP on the forward side of the seat tube reference plane RP is optimally positioned to prevent the chain C from falling off the smallest front chain ring 20a. In particular, this area is optimally positioned for most dual suspension frame designs, as explained below in more detail. However, the projecting surface 56a is preferably configured as disclosed herein for compatibility with other types of dual suspension frames as well as potential future rear suspension frame designs.

Due to the arrangement above, the projecting surface 56a has a maximum overall vertical height (i.e., the second overall vertical height $V_2$) measured in a direction parallel to the seat tube reference plane RP that is larger than the maximum overall width W of the projecting surface 56a measured in a direction perpendicular to the seat tube reference plane RP. The second (maximum) overall vertical height $V_2$ is slightly larger than the first (rearward most) overall vertical height $V_1$ and the third overall vertical height $V_3$. Thus, the second (maximum) overall vertical height $V_2$ is measured at a location less than 23 millimeters (i.e., between the seat tube reference plane RP and the forward plane FP) from the seat tube reference plane RP measured perpendicularly and forwardly from the seat tube reference plane RP. In any case, the maximum overall vertical height of the projecting surface 56a is preferably at least about 15 millimeters and preferably measured at a location less than 23 millimeters from the seat tube reference plane RP.

The chamfer surfaces 56b and 56c extend from the projecting surface 56a toward the fixing body 34 in an inclined arrangement as best shown in FIGS. 7-9. The upper chamfer surface 56b extends along an arc at an upper end of the projecting surface 56a, while the rearward chamfer surface 56c extends vertically along a rearward most edge of the projecting surface 56a. The upper chamfer surface 56b and the rearward chamfer surface 56c each have a width measured transverse thereto that is larger than 1 millimeter, preferably between 2 and 3 millimeters. An additional, very small chamfered edge surface (not numbered but illustrated in FIGS. 7-9) is provided at the forward most edge of the projecting surface 56a, with a width less than 1 millimeter.

Referring now to FIGS. 10-15, application of the front derailleur 12 to two different types of dual suspension bicycle frames B1 and B2 that are different than the bicycle frame illustrated in FIGS. 1-6 will now be discussed. In FIGS. 1-6, the bicycle 10 utilizes a dual suspension frame in which the front derailleur 12 will not normally move vertically relative to the front chain rings 20a, 20b and 20c when the rear wheel travels upwardly. Specifically, in FIGS. 1-6, the front derailleur 12 is mounted to a section of the seat tube portion 14 that is fixedly attached to relative to the bottom bracket mounting portion BB, as best seen in FIG. 2. However, with other dual suspension frame designs such as B1 illustrated in FIGS. 10-12 and B2 illustrated in FIGS. 13-15, the position of the front derailleur 12 may change relative to the front chain rings 20a, 20b and 20c.

Figure 10:
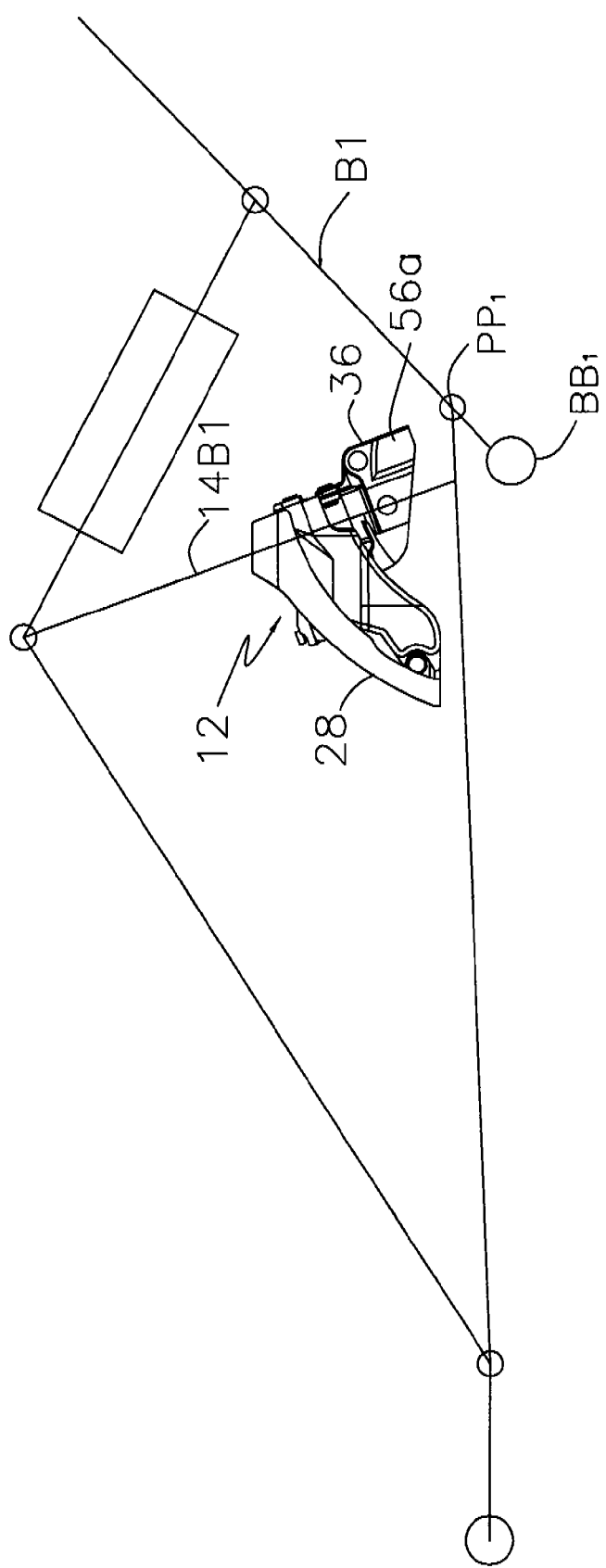
FIG. 10 is a diagrammatic side elevational view of the front derailleur illustrated in FIGS. 1-6 mounted on a first type of rear suspension frame, with the suspension located in a normal rest position.
Figure 11:
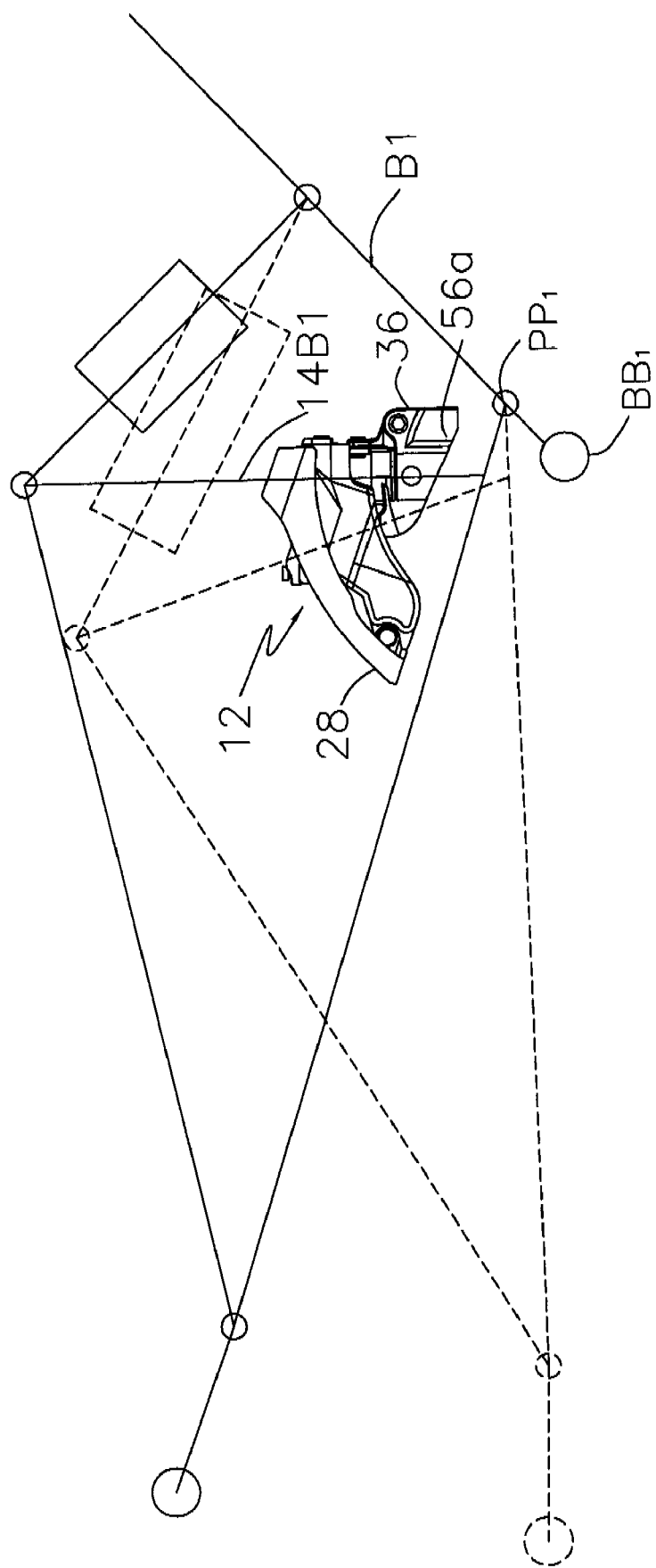
FIG. 11 is a diagrammatic side elevational view of the front derailleur illustrated in FIGS. 1-6 mounted on the first type of rear suspension frame illustrated in FIG. 10, with the suspension located in a compressed position.
Figure 12:
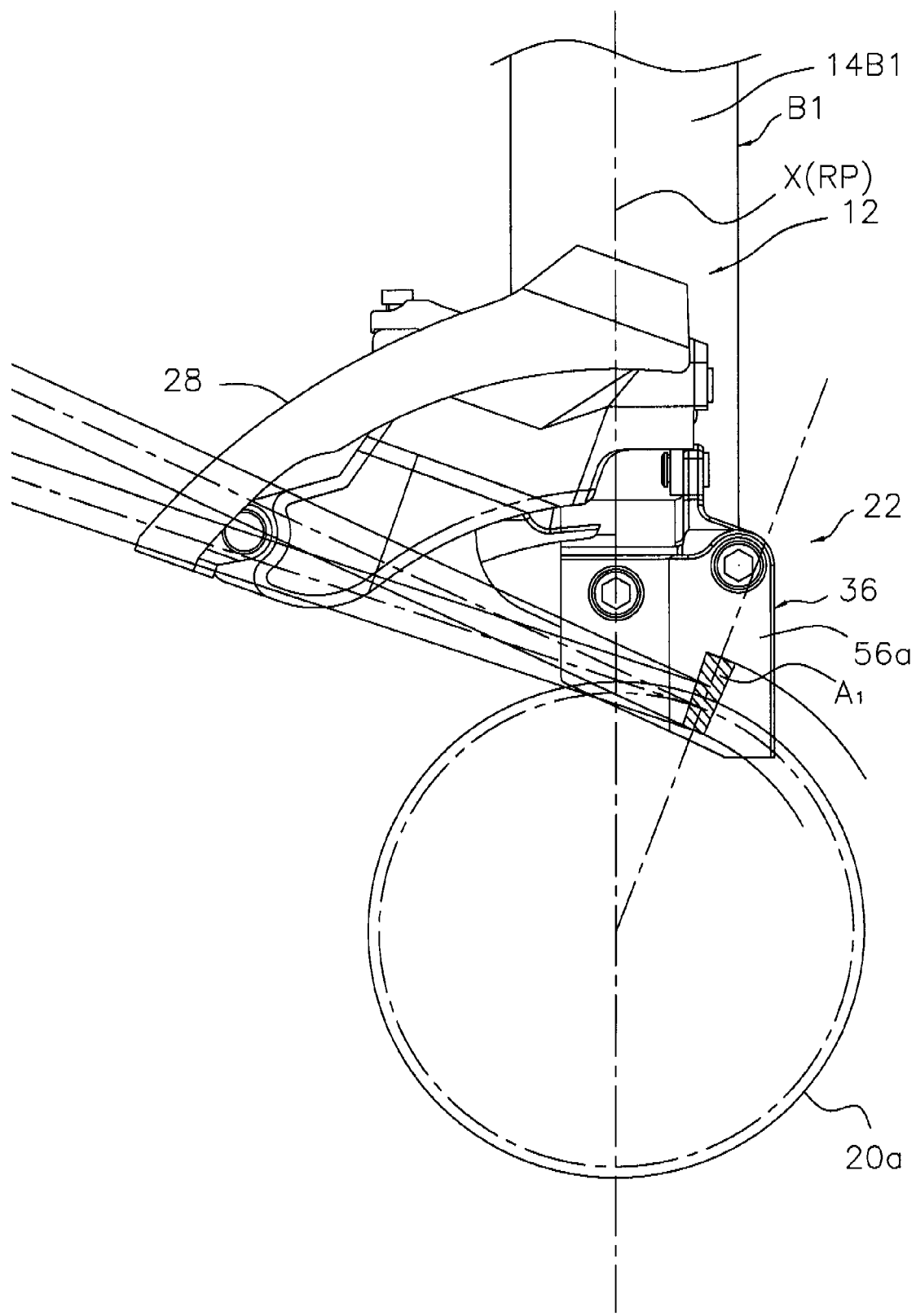
FIG. 12 is an enlarged side elevational view of the front derailleur illustrated in FIG. 11 with the smallest front chain ring diagrammatically illustrated in order to show the position of front derailleur relative to the smallest front chain ring with the first suspension located in a compressed position.

Specifically, in FIGS. 10-12, the front derailleur 12 is attached to the frame B1. In particular, the front derailleur 12 is attached to a section of a vertical tube portion 14B1 that pivots with the rear triangle about a pivot point $PP_1$ relative to a bottom bracket mounting portion $BB_1$ when the rear wheel travels vertically upwardly. FIG. 10 illustrates a normal position of the rear wheel and triangle, while FIG. 11 illustrates a traveled position in which the rear wheel has traveled about 6 inches vertically upwardly (the normal position is shown in broken lines in FIG. 11 for the purpose of illustration). In the traveled position, the front derailleur 12 moves vertically upwardly about 9.8 millimeters from the normal position to the position shown in FIGS. 11 and 12. However, due to the configuration of the projecting surface 56a of the projecting portion 54, an optimally positioned area $A_1$ for preventing the chain C from falling off the smallest front chain ring 20a substantially overlaps with the projecting surface 56a, as shown in FIG. 12.

Figure 13:
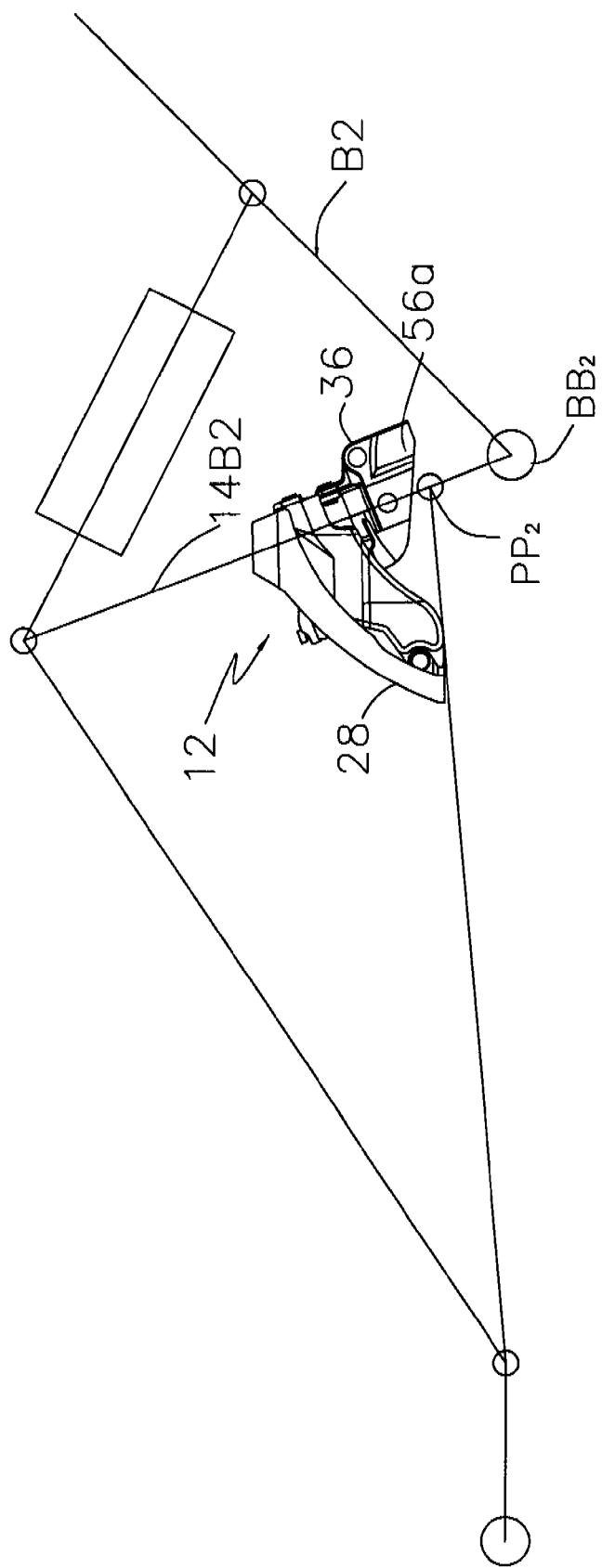
FIG. 13 is a diagrammatic side elevational view of the front derailleur illustrated in FIGS. 1-6 mounted on a second type of rear suspension frame, with the suspension located in a normal rest position.
Figure 14:
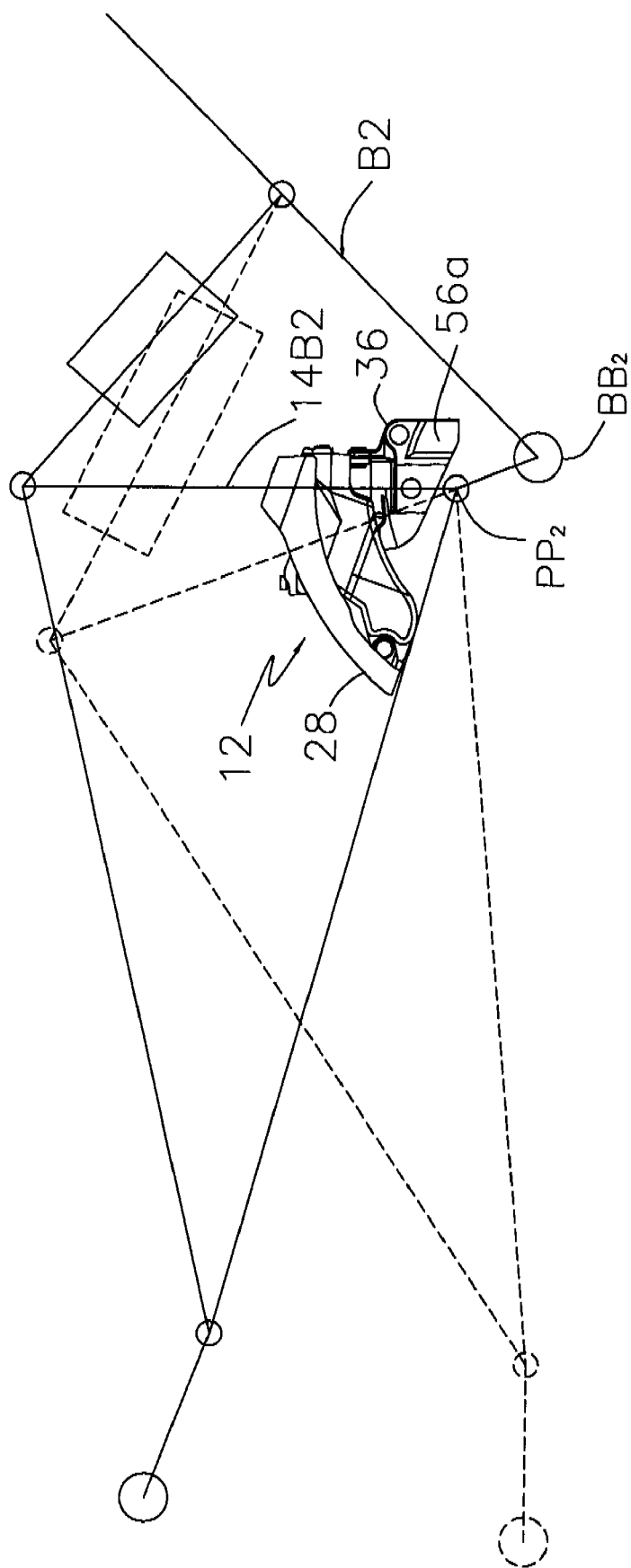
FIG. 14 is a diagrammatic side elevational view of the front derailleur illustrated in FIGS. 1-6 mounted on the second type of rear suspension frame illustrated in FIG. 13, with the suspension located in a compressed position.
Figure 15:
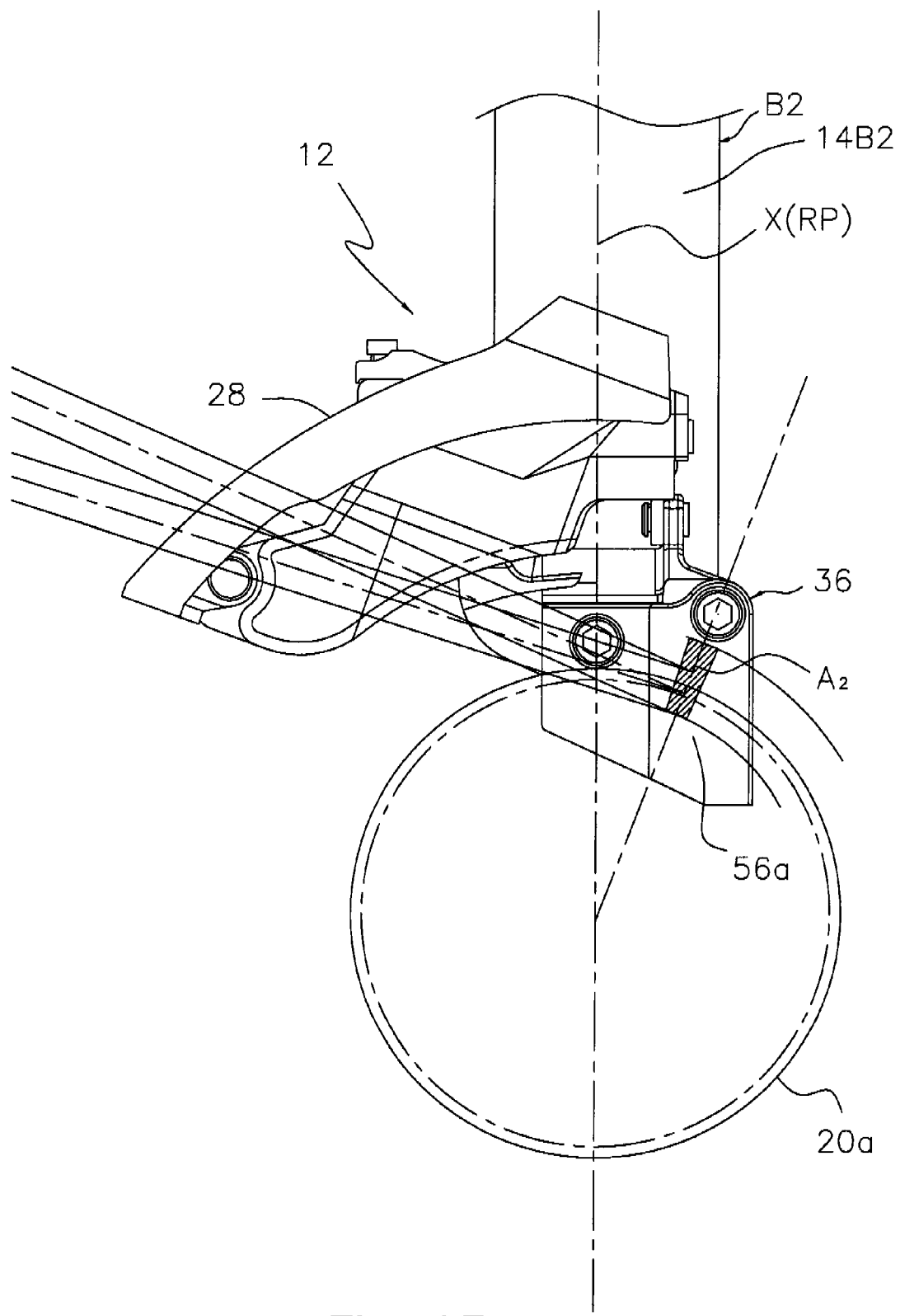
FIG. 15 is an enlarged side elevational view of the front derailleur illustrated in FIG. 14 with the smallest front chain ring diagrammatically illustrated in order to show the position of front derailleur relative to the smallest front chain ring with the second suspension located in a compressed position.

Alternatively, in FIGS. 13-15, the front derailleur 12 is attached to the frame B2. In particular, the front derailleur 12 is attached to a section of a vertical tube portion 14B2 that pivots with the rear triangle about a pivot point $PP_2$ relative to a bottom bracket mounting portion $BB_2$ when the rear wheel travels vertically upwardly. FIG. 13 illustrates a normal position of the rear wheel and triangle, while FIG. 14 illustrates a traveled position in which the rear wheel has traveled about 6 inches vertically upwardly (the normal position is shown in broken lines in FIG. 14 for the purpose of illustration). In the traveled position, the front derailleur 12 moves vertically downwardly about 2.3 millimeters from the normal position to the position shown in FIGS. 14 and 15. However, due to the configuration of the projecting surface 56a of the projecting portion 54, an optimally positioned area $A_2$ for preventing the chain C from falling off the smallest front chain ring 20a substantially overlaps the projecting surface 56a, as shown in FIG. 15.

In FIGS. 12 and 15, the projecting part 36 and the projecting portion 54 are illustrated as being vertically longer than illustrated in FIGS. 1-9 to increase the potential contact area of the projecting surface 56a. Thus, it will be apparent to those skilled in the art from this disclosure that the projecting part 36 and the projecting portion 54 can be vertically longer to increase the potential contact area of the projecting surface 56a. However, even with a projecting part 36 and projecting portion 54 dimensioned as illustrated in FIGS. 1-9 and discussed above, a sufficient contact area of the projecting surface 56a can be provided on dual suspension frames such as B1 and B2 such that a majority of the optimally positioned areas $A_1$ and $A_2$ will overlap the projecting surface 56a. Another example of an elongated (vertically) projection part is discussed below with respect to a fourth embodiment of the present invention.

Second Embodiment

Figure 16:
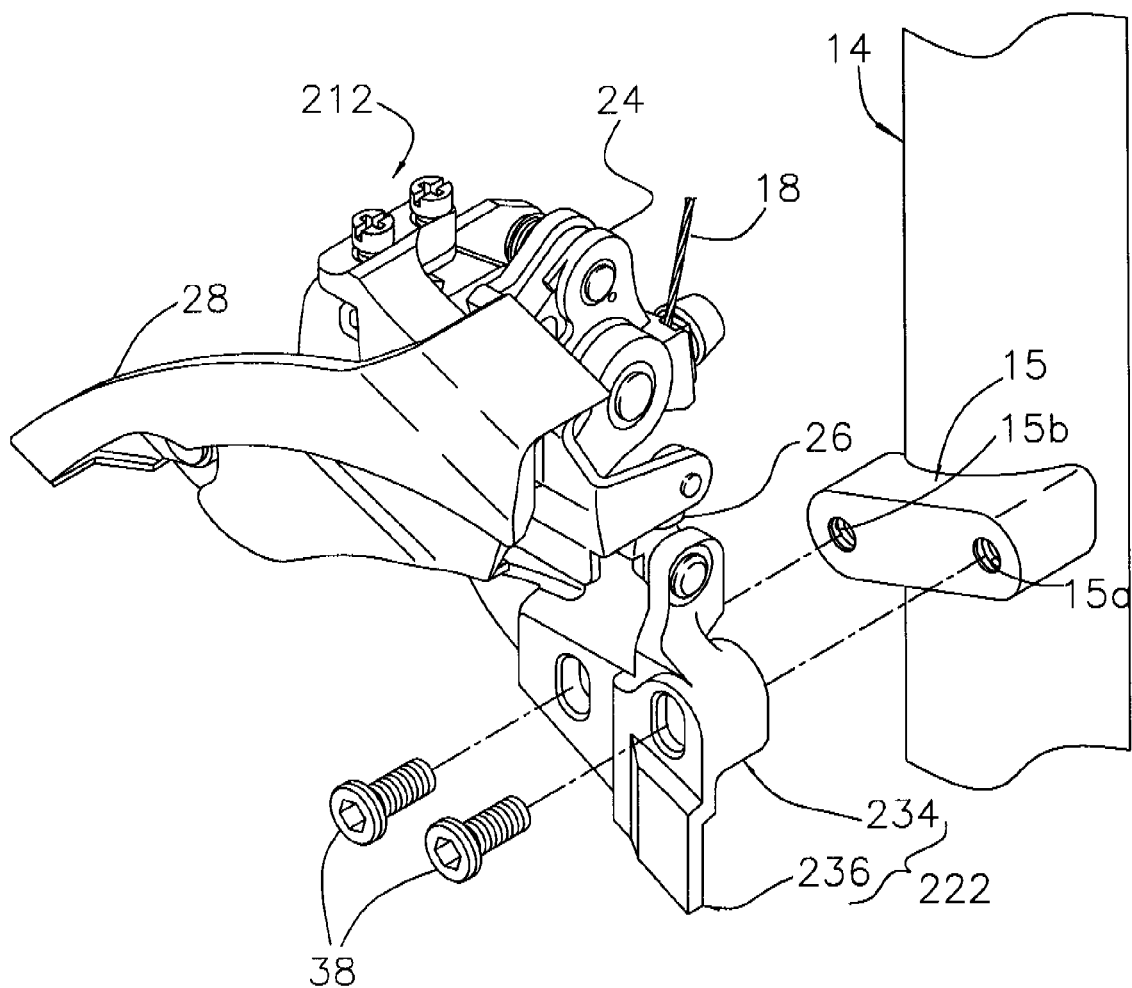
FIG. 16 is an enlarged, partially exploded, perspective view of a bicycle front derailleur in accordance with a second embodiment of the present invention, and a portion of the frame illustrated in FIGS. 1 and 2.

Referring now to FIG. 16, a bicycle front derailleur 212 in accordance with a second embodiment of the present invention will now be explained. The bicycle front derailleur 212 of this second embodiment is identical to the front derailleur 12 of the first embodiment, except that the front derailleur 212 of this second embodiment includes a modified fixed member 222. Specifically, the modified fixed member 222 of this second embodiment includes a fixing body 234 and a projection part 236 that is integrally formed with the fixing body 234 as a one-piece, unitary member.

In view of the similarity between the first and second embodiments, the parts of the second embodiment that are identical to the parts of the first embodiment will be given the same reference numerals as the parts of the first embodiment. Also, parts of this second embodiment that are functionally identical and/or substantially identical to parts of the first embodiment will be given the same reference numerals but with "200" added thereto. In any event, the descriptions of the parts of the second embodiment that are substantially identical to the parts of the first embodiment may be omitted for the sake of brevity. However, it will be apparent to those skilled in the art from this disclosure that the descriptions and illustrations of the first embodiment also apply to this second embodiment, except as discussed and/or illustrated herein.

Third Embodiment

Figure 17:
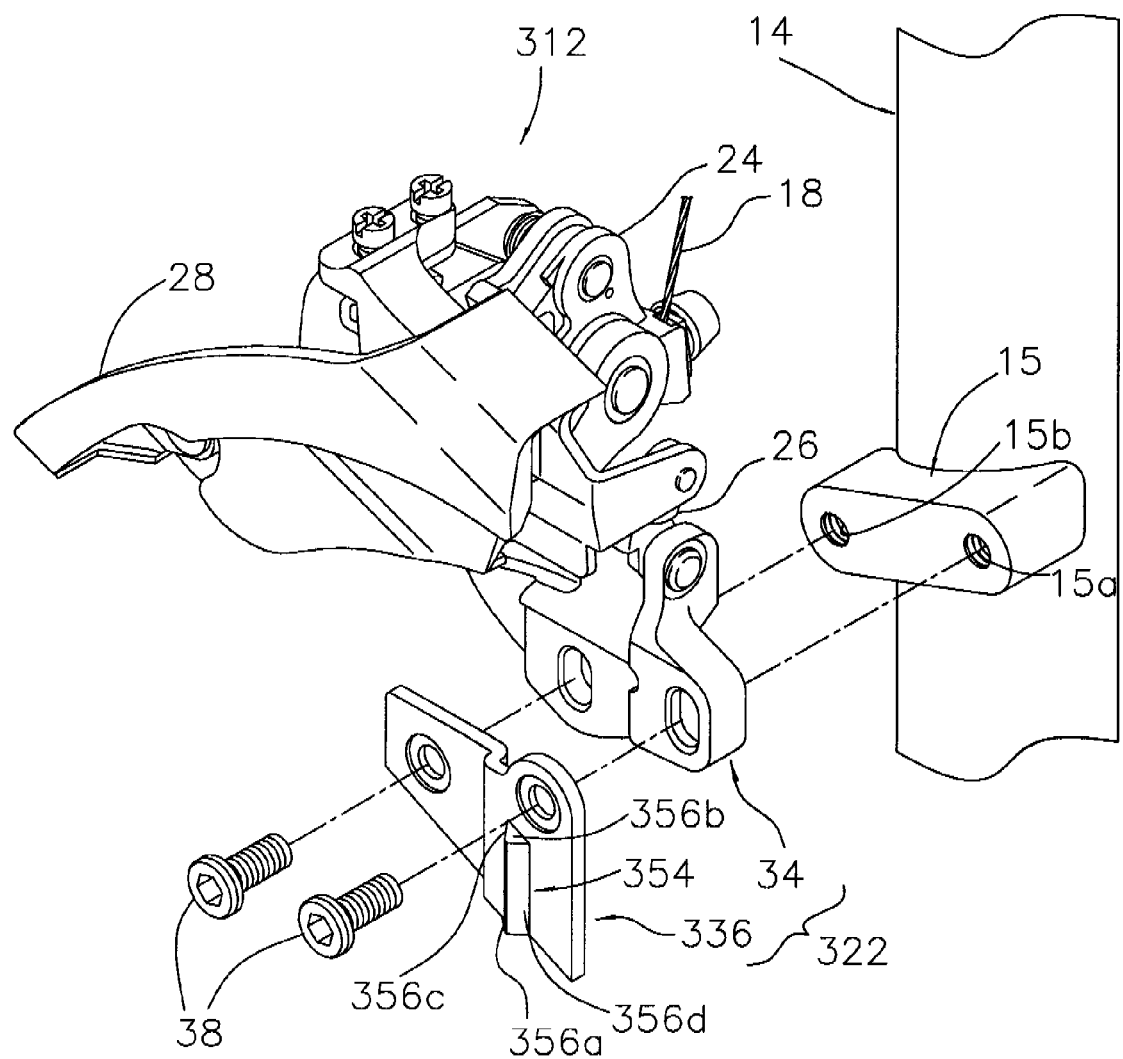
FIG. 17 is an enlarged, partially exploded, perspective view of a bicycle front derailleur in accordance with a third embodiment of the present invention, and a portion of the frame illustrated in FIGS. 1 and 2.
Figure 18:
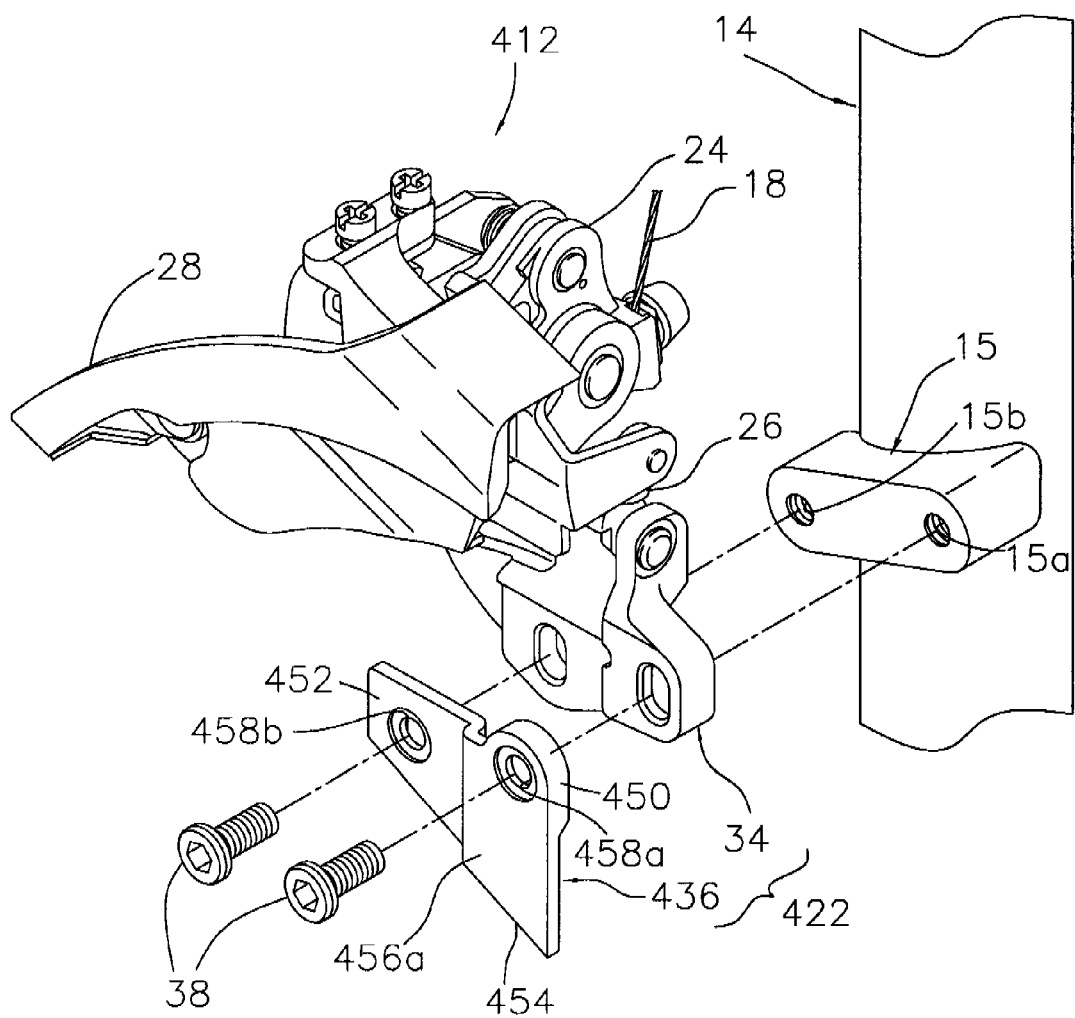
FIG. 18 is an enlarged, partially exploded, perspective view of a bicycle front derailleur in accordance with a second embodiment of the present invention, and a portion of the frame illustrated in FIGS. 1 and 2.

Referring now to FIG. 17, a bicycle front derailleur 312 in accordance with a third embodiment of the present invention will now be explained. The bicycle front derailleur 312 of this third embodiment is identical to the front derailleur 12 of the first embodiment, except that the front derailleur 312 of this third embodiment includes a modified fixed member 322. Specifically, the modified fixed member 322 of this third embodiment includes a fixing body 34 (identical to the first embodiment) and a modified projection part 336.

In view of the similarity between the first and third embodiments, the parts of the third embodiment that are identical to the parts of the first embodiment will be given the same reference numerals as the parts of the first embodiment. Also, parts of this second embodiment that are functionally identical and/or substantially identical to parts of the first embodiment will be given the same reference numerals but with "300" added thereto. In any event, the descriptions of the parts of the third embodiment that are substantially identical to the parts of the first embodiment may be omitted for the sake of brevity. However, it will be apparent to those skilled in the art from this disclosure that the descriptions and illustrations of the first embodiment also apply to this third embodiment, except as discussed and/or illustrated herein.

The modified projection part 336 includes a modified projecting portion 354, which is narrower than the projecting portion 54 of the first embodiment. Specifically, the projecting portion 354 includes a projecting surface 356a, an upper chamfer surface 356b, a rearward chamfer surface 356c as well as a forward chamfer surface 356d. The projecting surface 356a has a width smaller than about 1 millimeter measured in a direction perpendicular to the seat tube reference plane. The projecting surface 356a is spaced forwardly between about 14 millimeters and about 23 millimeters from the seat tube reference plane RP (preferably about 18-20 millimeters) measured perpendicularly relative to the seat tube reference plane RP. The projecting surface 356a has a vertical height equal to a corresponding section of the projecting surface 56a of the first embodiment. Thus, the projecting surface 356a preferably has an overall vertical height lying substantially in a single plane measured in a direction parallel to the seat tube reference plane RP that is between about 16 millimeters and about 17 millimeters. The chamfered surfaces 356b, 356c and 356d preferably have transverse widths larger than 1 millimeter, preferably 2-3 millimeters, such the projecting portion 354 has an overall width larger than 3 millimeters, preferably 4-5 millimeters.

Fourth Embodiment

Referring now to FIGS. 18-21, a bicycle front derailleur 412 in accordance with a fourth embodiment of the present invention will now be explained. The bicycle front derailleur 412 of this fourth embodiment is identical to the front derailleur 12 of the first embodiment, except that the front derailleur 412 of this fourth embodiment includes a modified fixed member 422. Specifically, the modified fixed member 422 of this fourth embodiment includes a fixing body 34 (identical to the first embodiment) and a modified projection part 436.

In view of the similarity between the first and fourth embodiments, the parts of the fourth embodiment that are identical to the parts of the first embodiment will be given the same reference numerals as the parts of the first embodiment. Also, parts of this second embodiment that are functionally identical and/or substantially identical to parts of the first embodiment will be given the same reference numerals but with "400" added thereto. In any event, the descriptions of the parts of the fourth embodiment that are substantially identical to the parts of the first embodiment may be omitted for the sake of brevity. However, it will be apparent to those skilled in the art from this disclosure that the descriptions and illustrations of the first embodiment also apply to this fourth embodiment, except as discussed and/or illustrated herein.

The modified projection part 436 includes a modified front mounting portion 450, a modified rear mounting portion 452 and a modified projecting portion 454 that is integrated with the front mounting portion 450 to form a modified, substantially longer projecting surface 456a. The front mounting portion 450 has a forward mounting hole 458a, while the rear mounting portion 452 has a rearward mounting hole 458b. Basically, the projection part 436, overall, is longer in a vertical direction than the projection parts discussed above (except as illustrated in FIGS. 12 and 15), and the forward mounting hole 458a is formed in the integrated front mounting/projecting portion 450/454. This principle of a vertically longer projection part can be applied to any of the above embodiments as discussed briefly above with respect to FIGS. 12 and 15. In any event, the projecting surface 456a has an overall vertical height lying substantially in a single plane measured in a direction parallel to the seat tube reference plane that is at least about 30 millimeters in an area between the seat tube reference plane and 23 millimeters measured perpendicularly and forwardly from the seat tube reference plane. In this embodiment, the vertical height of the projecting surface 456a varies from about 33 millimeters to about 41 millimeters. However, the area below the forward mounting hole 458a is most effective for preventing the chain C from falling off the smallest front chain ring 20a.

General Interpretation of Terms

As used herein, the terms "forward, rearward, upward, above, downward, below and transverse" as well as other similar directional terms refer to those directions of a bicycle in its normal riding position, to which the front derailleur 12 is attached, except as explained otherwise herein. Accordingly, these terms, as utilized to describe the front derailleur 12 in the claims, should be interpreted relative to the bicycle 10 in its normal riding position, except as explained otherwise herein.

In understanding the scope of the present invention, the term "configured" as used herein to describe a component, section or part of a device includes hardware and/or software that is constructed and/or programmed to carry out the desired function. In understanding the scope of the present invention, the term "comprising" and its derivatives, as used herein, are intended to be open ended terms that specify the presence of the stated features, elements, components, groups, integers, and/or steps, but do not exclude the presence of other unstated features, elements, components, groups, integers and/or steps. The foregoing also applies to words having similar meanings such as the terms, "including", "having" and their derivatives.

Also, the terms "part," "section," "portion," "member" or "element" when used in the singular can have the dual meaning of a single part or a plurality of parts. As used herein to describe the present invention, the following directional terms "forward, rearward, above, downward, vertical, horizontal, below and transverse" as well as any other similar directional terms refer to those directions of a bicycle equipped with the present invention. Accordingly, these terms, as utilized to describe the present invention should be interpreted relative to a bicycle equipped with the present invention as used in the normal riding position.

Finally, terms of degree such as "substantially", "about" and "approximately" as used herein mean a reasonable amount of deviation of the modified term such that the end result is not significantly changed. For example, these terms can be construed as including a deviation of at least ±5% of the modified term if this deviation would not negate the meaning of the word it modifies.

While only selected embodiments have been chosen to illustrate the present invention, it will be apparent to those skilled in the art from this disclosure that various changes and modifications can be made herein without departing from the scope of the invention as defined in the appended claims. Furthermore, the foregoing descriptions of the embodiments according to the present invention are provided for illustration only, and not for the purpose of limiting the invention as defined by the appended claims and their equivalents.

What is claimed is:

1. A bicycle front derailleur comprising:
a fixed member including a fixing body and a projection part fixedly coupled to the fixing body, the fixing body including a fastening portion with a seat tube reference plane that aligns with a longitudinal center axis of a seat tube when coupled thereto, the projection part having a projecting surface that is perpendicularly oriented to the seat tube reference plane, the projecting surface being offset axially from the fixing body toward a smallest front chain ring of a bicycle front crankset, the projecting surface having an overall vertical height lying substantially in a single plane measured in a direction parallel to the seat tube reference plane that is greater than 10 millimeters in an area the projecting surface being located between the seat tube reference plane and 23 millimeters measured perpendicularly and forwardly from the seat tube reference plane, the projecting surface being positioned at a radial inward location with respect to an outermost portion of the smallest front chain ring in a direction towards a center rotation axis of the smallest front chain ring, the fixed member being fixedly supported with respect to the seat tube at only the fastening portion when coupled thereto, the projection part extending downward in the direction parallel to the seat tube reference plane from the fastening portion in a cantilevered fashion with respect to the seat tube when coupled thereto;
a chain guide configured to move between a retracted position and an extended position relative to the fixing body; and
a linkage assembly coupled between the fixing body and the chain guide in order to move the chain guide between the retracted position and the extended position,
the fixing body having at least one frame attachment through hole that is configured and arranged to receive a fastener therethrough with the fastener being directly coupled to a mounting element of the seat tube, the projection part having at least one through hole that is aligned with the frame attachment through hole to receive the fastener therethrough such that the fixing body and the projection part are fixed to the mounting element of the seat tube by the fastener,
the projection part including a rearward chamfer surface that rearwardly extends from a rearwardmost edge of the projecting surface toward the fixing body in an inclined arrangement, the rearward chamfer surface being positioned at the radial inward location with respect to the outermost portion of the smallest front chain ring in the direction towards the center rotation axis of the smallest front chain ring, and a rearwardmost edge of the rearward chamfer surface being positioned at a frontward location of the fixed member relative to the seat tube reference plane.

2. The bicycle front derailleur according to claim 1, wherein
the projection part is formed as a separate member from the fixing body.

3. The bicycle front derailleur according to claim 2, wherein
the projection part is further fixedly attached to the fixing body using a second fastener.

4. The bicycle front derailleur according to claim 1, wherein
the projection part is integrally formed with the fixing body as a one-piece, unitary member.

5. The bicycle front derailleur according to claim 1, wherein
the projection part includes a chamfer surface that extends from the projecting surface toward the fixing body.

6. The bicycle front derailleur according to claim 5, wherein
the chamfer surface extends along an arc at an upper end of the projecting surface.

7. The bicycle front derailleur according to claim 1, wherein
the projecting surface has a maximum overall vertical height measured in a direction parallel to the seat tube reference plane that is larger than a maximum overall width of the projecting surface measured in a direction perpendicular to the seat tube reference plane.

8. The bicycle front derailleur according to claim 7, wherein
the maximum overall vertical height is measured at a location less than 23 millimeters from the seat tube reference plane measured perpendicularly and forwardly from the seat tube reference plane.

9. The bicycle front derailleur according to claim 8, wherein
the maximum overall vertical height is at least about 15 millimeters.

10. A bicycle front derailleur comprising:
a fixed member including a fixing body and a projection part fixedly coupled to the fixing body, the fixing body including a fastening portion with a seat tube reference plane that aligns with a longitudinal center axis of a seat tube when coupled thereto, the projection part having a projecting surface that is perpendicularly oriented to the seat tube reference plane, the projecting surface being offset axially from the fixing body toward a smallest front chain ring of a bicycle front crankset, the projecting surface having an overall vertical height lying substantially in a single plane measured in a direction parallel to the seat tube reference plane in an area the projecting surface being located between the seat tube reference plane and a location spaced perpendicularly from and located forwardly of the seat tube reference plane, the projecting surface being positioned at a radial inward location with respect to an outermost position of the smallest front chain ring in a direction towards a center rotation axis of the smallest front chain ring;
a chain guide configured to move between a retracted position and an extended position relative to the fixing body; and
a linkage assembly coupled between the fixing body and the chain guide in order to move the chain guide between the retracted position and the extended position,
the fixing body having at least one frame attachment through hole that is configured and arranged to receive a fastener therethrough with the fastener being directly coupled to a mounting element of the seat tube, the projection part having at least one through hole that is aligned with the frame attachment through hole to receive the fastener therethrough such that the fixing body and the projection part being fixed to the mounting element of the seat tube by the fastener,
the projection part including a rearward chamfer surface that rearwardly extends from a rearwardmost edge of the projecting surface toward the fixing body in an inclined arrangement, the rearward chamfer surface being positioned at the radial inward location with respect to the outermost portion of the smallest front chain ring in the direction towards the center rotation axis of the smallest front chain ring, and a rearwardmost edge of the rearward chamfer surface being positioned at a frontward location of the fixed member relative to the seat tube reference plane.

11. The bicycle front derailleur according to claim 1, wherein
the overall vertical height lying substantially in a single plane measured in a direction parallel to the seat tube reference plane that is at least about 15 millimeters in an area between the seat tube reference plane and 23 millimeters measured perpendicularly and forwardly from the seat tube reference plane.

12. The bicycle front derailleur according to claim 11, wherein
the overall vertical height lying substantially in a single plane measured in a direction parallel to the seat tube reference plane that is at least about 30 millimeters in an area between the seat tube reference plane and 23 millimeters measured perpendicularly and forwardly from the seat tube reference plane.

13. The bicycle front derailleur according to claim 1, wherein
the projecting surface has a width smaller than about 1 millimeter measured in a direction perpendicular to the seat tube reference plane.

* * * * *